United States Patent [19]

Kameyama

[11] Patent Number: 5,708,517
[45] Date of Patent: Jan. 13, 1998

US005708517A

[54] IMAGE FORMING APPARATUS

[75] Inventor: Kenji Kameyama, Isehara, Japan

[73] Assignee: Ricoh Company, Ltd., Tokyo, Japan

[21] Appl. No.: 619,233

[22] Filed: Mar. 21, 1996

Related U.S. Application Data

[62] Division of Ser. No. 359,538, Dec. 20, 1994.

[30] Foreign Application Priority Data

| Dec. 20, 1993 | [JP] | Japan | 5-319666 |
| Dec. 20, 1993 | [JP] | Japan | 5-319667 |
| May 9, 1994 | [JP] | Japan | 6-94596 |
| Sep. 1, 1994 | [JP] | Japan | 6-208296 |

[51] Int. Cl.$^6$ ............................................. H04N 1/12
[52] U.S. Cl. ........................... 358/498; 358/474; 271/121
[58] Field of Search .................................. 358/471, 474, 358/496, 498; 355/309; 271/161, 188, 220, 264, 265, 273–274, 121, 124; 399/371–374; H04N 1/03, 1/12

[56] References Cited

U.S. PATENT DOCUMENTS

| 4,505,603 | 3/1985 | Yana . | |
| 4,729,036 | 3/1988 | Ikeda et al. . | |
| 4,849,824 | 7/1989 | Sakuragi et al. . | |
| 4,978,115 | 12/1990 | Sato et al. . | |
| 5,077,618 | 12/1991 | Sakai et al. | 358/498 |
| 5,128,763 | 7/1992 | Sakuragi . | |
| 5,245,354 | 9/1993 | Ono et al. . | |
| 5,274,477 | 12/1993 | Mori et al. | 358/498 |
| 5,337,165 | 8/1994 | Riousset et al. | 358/498 |
| 5,400,146 | 3/1995 | Otsuki et al. . | |
| 5,452,098 | 9/1995 | Sato et al. | 358/498 |
| 5,519,512 | 5/1996 | Bandai et al. | 358/498 |
| 5,526,141 | 6/1996 | Ogura et al. | 358/498 |
| 5,528,277 | 6/1996 | Nardone et al. . | |
| 5,533,821 | 7/1996 | Awai et al. . | |

*Primary Examiner*—Kim Vu
*Attorney, Agent, or Firm*—Oblon, Spivak, McClelland, Maier & Neustadt, P.C.

[57] ABSTRACT

An image forming apparatus having a recording section for recording an image on a thermosensitive sheet paid out from a roller with a record head and a platen roller, and a reading section for reading a document with a scanner and a conveyor roller. The apparatus holds the head, presses the head against a platen roller, and has a conveyor roller mounted to the recording section, each in a unique configuration so as to reduce the number of parts and facilitate assembly.

14 Claims, 18 Drawing Sheets

IMAGE FORMING APPARATUS

This is a Division, of application Ser. No. 08/359,538 filed on Dec. 20, 1994.

BACKGROUND OF THE INVENTION

The present invention relates to a facsimile apparatus or similar image forming apparatus and, more particularly, to an image forming apparatus having a recording section for recording an image on a thermosentitive paper paid out from a roll with a record head, and a reading section for reading a document with a scanner and a conveyor roller.

An image forming apparatus of the type described is implemented as, for example a miniature facsimile apparatus, particularly an inexpensive facsimile apparatus combined with a telephone. Such an apparatus is disclosed in, for example, Japanese Utility Model Laid-Open Publication Nos. 1-131544, 63-154237, and 4-124663.

Generally, this type of apparatus has a recording section and a paper feeding section. The recording section includes a record head or thermal head having a plurality of minute heating elements arranged in a predetermined direction, and a platen roller facing the head. The paper feeding section has a paper holder included in a base and accommodating a roll of paper or thermosensitive paper therein. To be movable toward and away from the platen roller, the head is held by a stationary bracket via, for example, a movable bracket and positioning members. The stationary bracket is affixed to the base or an openable cover disposed above the paper holder. A leaf spring, coil spring or similar resilient member intervenes between the stationary bracket and the movable bracket and constantly biases the head toward the platen roller. In this condition, the head and platen roller are pressed against each other by a desired pressure. The platen roller is rotatably supported by bearings at opposite ends thereof, provided with a gear at one end, and restricted in the axial direction by independent parts, as taught in, for example, Japanese Patent Laid-Open Publication No. 61-137757.

The apparatus further includes a reading section having a read sensor for reading a document, and a conveyor roller facing the read sensor. The conveyor roller is rotated in pressing contact with the read sensor so as to convey a document. One of the read sensor and conveyor roller is mounted on the base while the other is mounted on a cover hinged to the base. The conveyor roller, like the platen roller, is rotatably supported by bearings at opposite ends thereof, provided with a gear on one end, and restricted in the axial direction by independent parts. The cover is moved toward and away from the base to, in turn, move the read sensor toward and away from the conveyor roller, thereby covering or uncovering the top of the reading section. When the cover is closed, the read sensor and conveyor roller are pressed against each other by a predetermined pressure.

However, the conventional image forming apparatus is expensive since it needs a number of parts for holding the head and conveyor roller, a complicated arrangement for pressing the head toward the platen roller, and a great number of assembling steps. Moreover, when the platen roller noticeably deforms, a uniform pressure is not attainable between the roller and the head, resulting in irregular image density. These problems are particularly serious with miniature facsimile apparatuses which should be low cost. The problems with the conventional apparatus will be discussed hereinafter more specifically.

(1) A number of members are needed to hold the head and press the head toward the platen roller. Since such members are independent of each other, it is impossible to arrange them at substantially the same position and cause them to serve their functions without complicating the their configurations. Hence, the apparatus is difficult to assemble.

(2) To allow the head to move toward and away from the platen roller, the movable bracket and stationary bracket must be implemented as respective members independent of the base and sufficiently spaced apart from each other.

(3) The portion of the stationary bracket supporting the movable bracket must be provided with play such that the movable bracket can move. Particularly, the movement of the movable bracket in the widthwise direction (i.e. play in the axial direction of the platen roller) must be restricted by extra members.

(4) For the above purpose, the movable bracket may be provided with positioning pawls engageable with the shaft of the platen roller. However, when the head and platen roller are released from each other, the movable bracket is released form the platen roller. As a result, it is likely that the head is brought out of the predetermined widthwise range (predetermined range in the axial direction of the platen roller) or the pawls are damaged.

(5) Although the head may be directly mounted on a printed circuit board, a heavy load is necessary for the head to move and makes it difficult to set up an adequate pressure between it and the platen roller.

(6) A long cable is needed to connect a printed circuit board mounted on the bottom of the apparatus to the head.

(7) Despite that the platen roller deforms due to the pressure of the head, the pressure acts on the roller via the movable bracket having rigidity high enough to reduce the deformation of the head. Hence, it is difficult to set up a uniform pressure over the entire widthwise range, resulting in irregular image density.

(8) The shaft of the platen roller may be reduced in diameter or made of resin in order to reduce the size and cost of the roller. However, such a shaft will aggravate the deformation of the roller. Although a reinforcing member may be located at the rear of the roller in order to reduce the deformation, it will increase the size and cost of the apparatus.

(9) The platen roller and conveyor roller must be held by respective bearings and restricted in the axial direction by respective extra members, e.g., E-rings. In addition, the rollers must be formed with grooves for receiving such members by extra steps.

(10) The gear must be fixed in place by, for example, a screw. This, coupled with the fact that the platen roller must be rotated together with the gear, further increases the number of assembling steps.

(11) When such a number of parts are assembled, their dimensional errors accumulate. To solve this problem, it is necessary to provide the individual parts with strict dimensional accuracy and to manage the dimensions of the parts individually.

(12) When the top of the reading section is covered to press the read sensor against the conveyor roller, the roller deforms and cannot be pressed by a uniform pressure. In this condition a document being conveyed by the roller is apt to skew.

(13) The shaft of the conveyor roller may be reduced in diameter or made of resin in order to reduce the size and cost of the roller. However, such a shaft will aggravate the deformation of the roller. Although a reinforcing member may be located at the rear of the roller in order to reduce the deformation, it will again increase the size and cost of the apparatus.

SUMMARY OF THE INVENTION

It is, therefore, an object of the present invention to provide an image forming apparatus which simplifies an arrangement around a record head and facilitates assembly to thereby reduce size and cost.

It is another object of the present invention to provide an image forming apparatus in which a record head and a platen roller are pressed against each other in a unique configuration so as to eliminate irregular image density.

It is another object of the present invention to provide an image forming apparatus in which a conveyor roller and an image sensor are pressed against each other in a unique configuration so as to obviate skewing and insure high image quality.

It is another object of the present invention to provide an inexpensive image forming apparatus in which a platen roller and a conveyor roller are assembled in a unique configuration to reduce the number of parts and the number of assembling steps.

It is another object of the present invention to provide an image forming apparatus in which a platen roller and a conveyor roller are each rotatably supported and restricted in the axial direction by independent means, thereby enhancing the accurate positioning of the rollers and insuring high image quality.

It is another object of the present invention to provide an image forming apparatus in which a platen roller and a conveyor roller are each positioned relative to a base in the axial direction and thereby accurately positioned relative to a record head and a read sensor, respectively, thereby improving image quality and allowing respective covers to move smoothly.

It is another object of the present invention to provide an inexpensive image forming apparatus which facilitates the postprocessing of a platen roller and that of a conveyor roller.

In accordance with the present invention, an image forming apparatus has a base, a recording device having a record head and a platen roller pressed against each other with the intermediary of a paper, and a head holding member for holding the record head such that the record head is movable toward and away from the platen roller, and a reading device having a conveyor roller for conveying a document, a read sensor located for reading the document at a reading section, and a roller holding member for rotatably holding the conveyor roller and formed integrally with the base.

Also, in accordance with the present invention, an image forming apparatus has a base having a paper holder for holding a paper formed integrally therewith, a record head and a platen roller pressed against each other by a predetermined pressure with the intermediary of the paper, and a head holding member having a plurality of members formed integrally with the base and for holding the record head such that the head is selectively movable in a predetermined direction toward and away from the platen roller.

Further, in accordance with the present invention, an image forming apparatus has a record head and a platen roller facing each other, and pressing members for pressing the record head to thereby press the record head and platen roller by a predetermined pressure with the intermediary of a paper. The pressing members are at least three elastically deformable pressing members respectively neighboring the center and opposite ends of the record head in the axial direction of the platen roller and exerting pressures preselected such that when the record head and platen roller are straight, the pressure at the center is higher than the pressures at the opposite ends. The platen roller is deformed by a predetermined amount by the pressures of the pressing members while being supported at opposite ends thereof and, in turn, causes the record head to deform complementarily thereto, whereby the record head and platen roller are pressed against each other by a substantially uniform pressure.

Furthermore, in accordance with the present invention, an image forming apparatus has a base having a paper holder for holding a paper formed integrally therewith, a platen roller having at least a gear on the end thereof to be driven via the gear, a record head facing the platen roller with the intermediary of the paper, and a plotter cover rotatably supporting the platen roller and for selectively covering or uncovering the paper holder such that the platen roller moves toward or away from the record head. The plotter cover is formed with a pair of aligned holes for removably mounting the platen roller when the platen roller is moved in the axial direction thereof. The plotter cover and platen roller have respective abutments abutting against each other when the platen roller is moved to one side in the axial direction. One of the plotter cover and platen roller has a deformable locking portion engaging, when the platen roller is moved to the one side, with the other of the plotter cover and platen roller and deforming in a direction perpendicular to the axial direction of the platen roller. The deformable locking portion is, when the abutments abut against each other, elastically restored to thereby restrict the movement of the platen roller to the other side in the axial direction.

Moreover, in accordance with the present invention, an image forming apparatus has a reading device for reading a document positioned at a reading section, a conveyor roller facing the reading section and rotated via a gear provided at one end thereof, and a roller holding member for rotatably holding the conveyor roller. The roller holding member is formed with a pair of aligned holes for removably mounting the conveyor roller when the conveyor roller is moved in the axial direction thereof. The roller holding member and conveyor roller have respective abutments abutting against each other when the conveyor roller is moved to one side in the axial direction. One of the roller holding member and conveyor roller has a deformable locking portion engaging, when the conveyor roller is moved to the one side, with the other of the roller holding member and conveyor roller and deforming in a direction perpendicular to the axial direction of the conveyor roller. The deformable locking portion is, when the abutments abut against each other, elastically restored to thereby restrict the movement of the conveyor roller to the other side in the axial direction.

In addition, in accordance with the present invention, an image forming apparatus has a reading section for reading a document positioned at a reading portion, a conveyor roller rotatable while facing the reading portion, and pressing members for pressing the reading portion such that the reading portion and conveyor roller are pressed against each other by a predetermined pressure with the intermediary of a document. The pressing members has at least three elastically deformable pressing members respectively neighboring the center and opposite ends of the reading portion in the axial direction of the conveyor roller and exerting pressures preselected such that when the reading portion and conveyor roller are straight, the pressure at the center is higher than the pressures at the opposite ends. The conveyor roller is deformed by a predetermined amount by the pressures of the pressing members while being supported at opposite ends thereof and, in turn, causes the reading portion to deform complementarily thereto, whereby the reading portion and conveyor roller are pressed against each other by a substantially uniform pressure.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
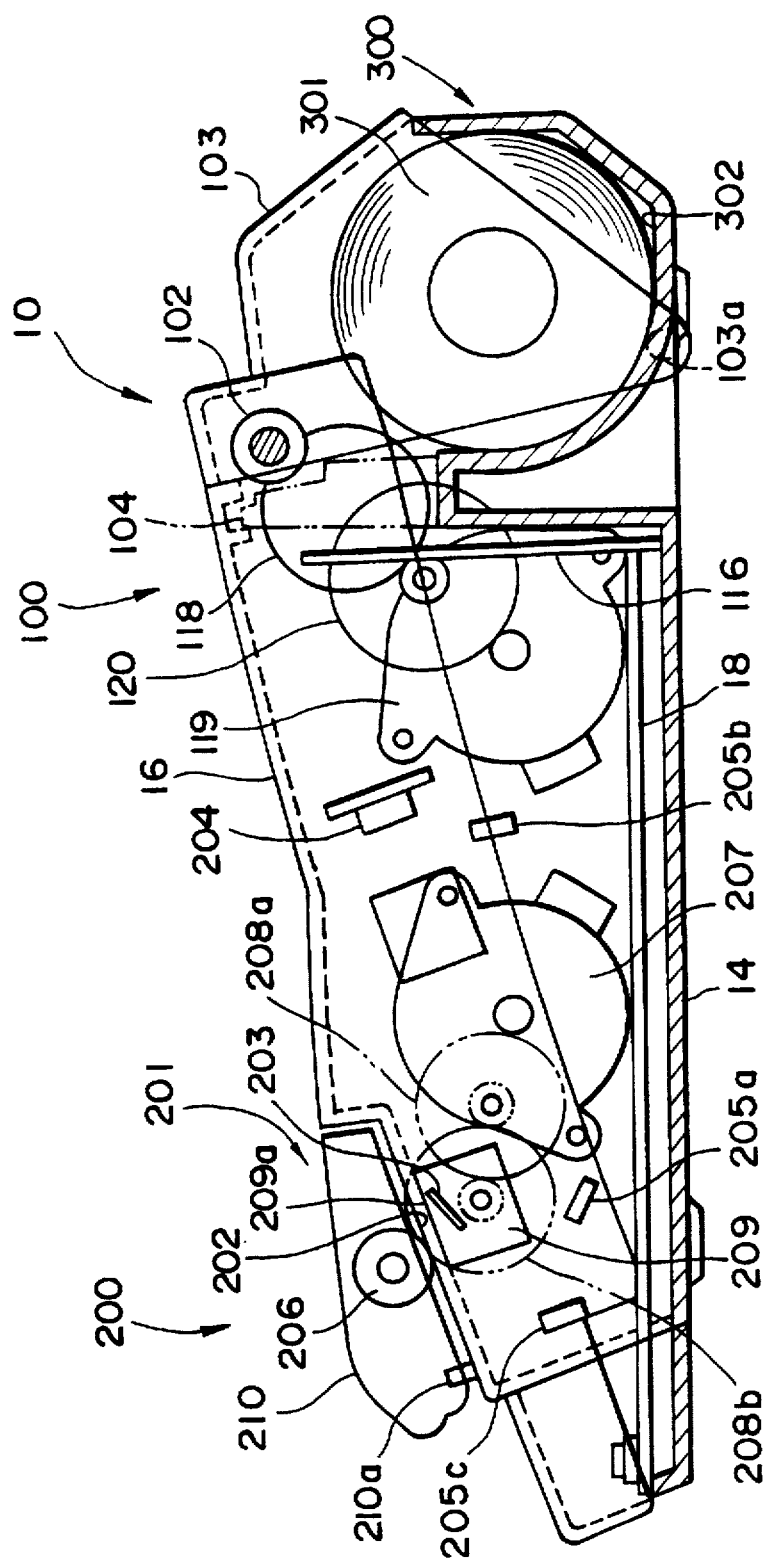
FIG. 1 is a sectional side elevation of an image forming apparatus embodying the present invention.

Referring to FIG. 1 of the drawings, an image forming apparatus embodying the present invention is shown and generally designated by the reference numeral 10. As shown, the apparatus 10 is generally made up of a recording section 100, a reading section 200, and a paper feed section 300. A casing or base 14 consitutes the body of the apparatus 10. A cover 16 is mounted on the top of the base 14 and provided with an operating section, display and so forth thereon. A printed circuit board 18 is mounted on the base 14 and constitutes a control circuit.

The recording section 100, reading section 200 and paper feed section 300 will be described hereinafter specifically.

[1] Recording Section 100

Figure 2:
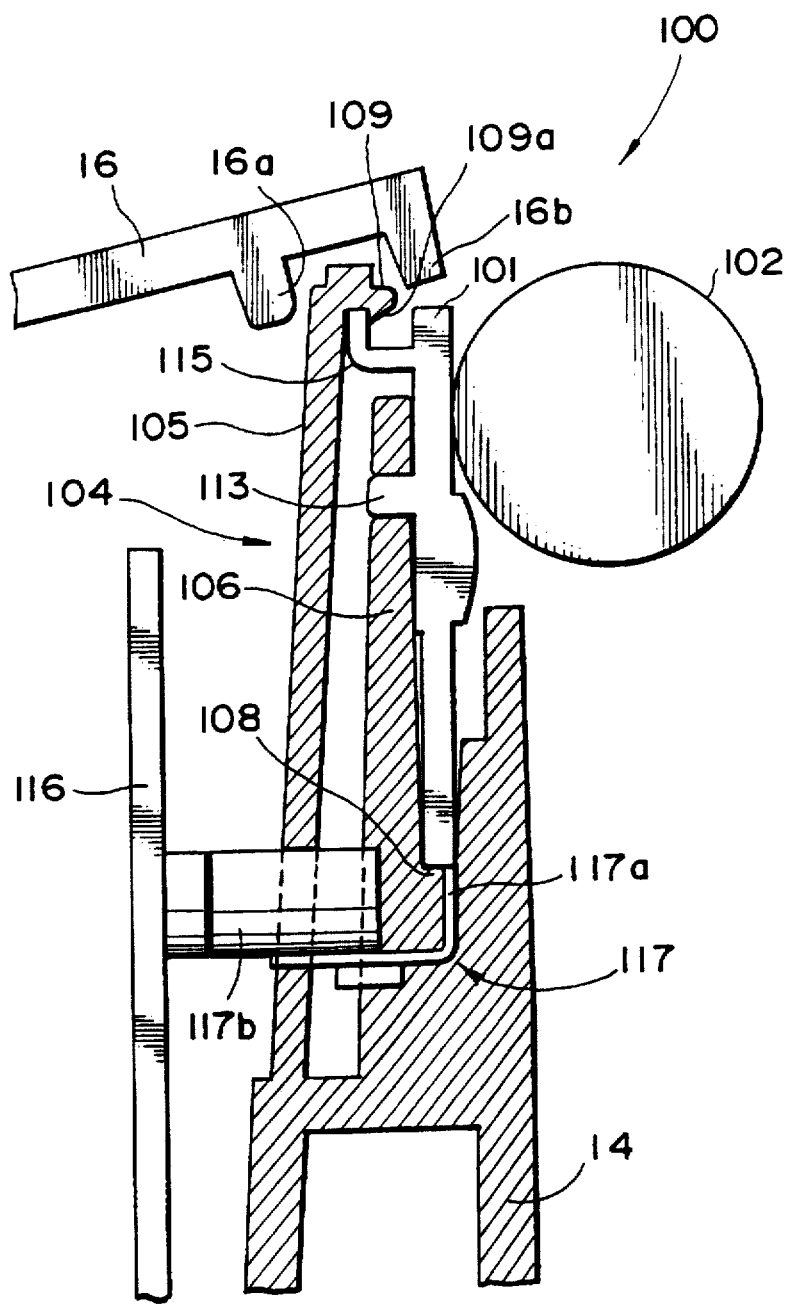
FIG. 2 is a section of a recording section included in the embodiment.

As shown in FIGS. 1 and 2, the section 100 has a record head 101 for recording an image on a webbing or paper paid out from a roll 301. A platen roller 102 faces the head 101 with the intermediary of the paper 301. A plotter cover 103 is hinged to the base 14 at a fulcrum 103a. The paper 301 and record head 101 may be implemented as a thermosensitive paper and a thermal head, respectively. For the head 101, use may be made of a conventional head having a metallic heat radiation base flexible within a predetermined range, a head body carrying a number of small heating elements, and a flexible printed circuit board on which a circuit pattern and electronic parts are mounted. The head 101 is pressed against the platen 102 by pressing members, which will be described, exerting a predetermined pressure. The platen roller 102 may be of the kind having a shaft made of resin or implemented as a thin metallic shaft, and a pair of identical gears respectively provided on opposite ends thereof (e.g. gears molded integrally with the shaft). The plotter cover 103 is rotatable about the fulcrum 103a in the right-and-left direction, as viewed in FIG. 1, so as to selectively cover or uncover the top of a paper holder portion 302 which forms part of the base 14. When the plotter cover 103 is closed, it is locked to the cover 16. The platen roller 102 is journalled to the plotter cover 103. When the plotter cover is closed 103, the platen roller 102 has the gear thereof brought into mesh with a drive gear, as will be described later.

Figure 3:
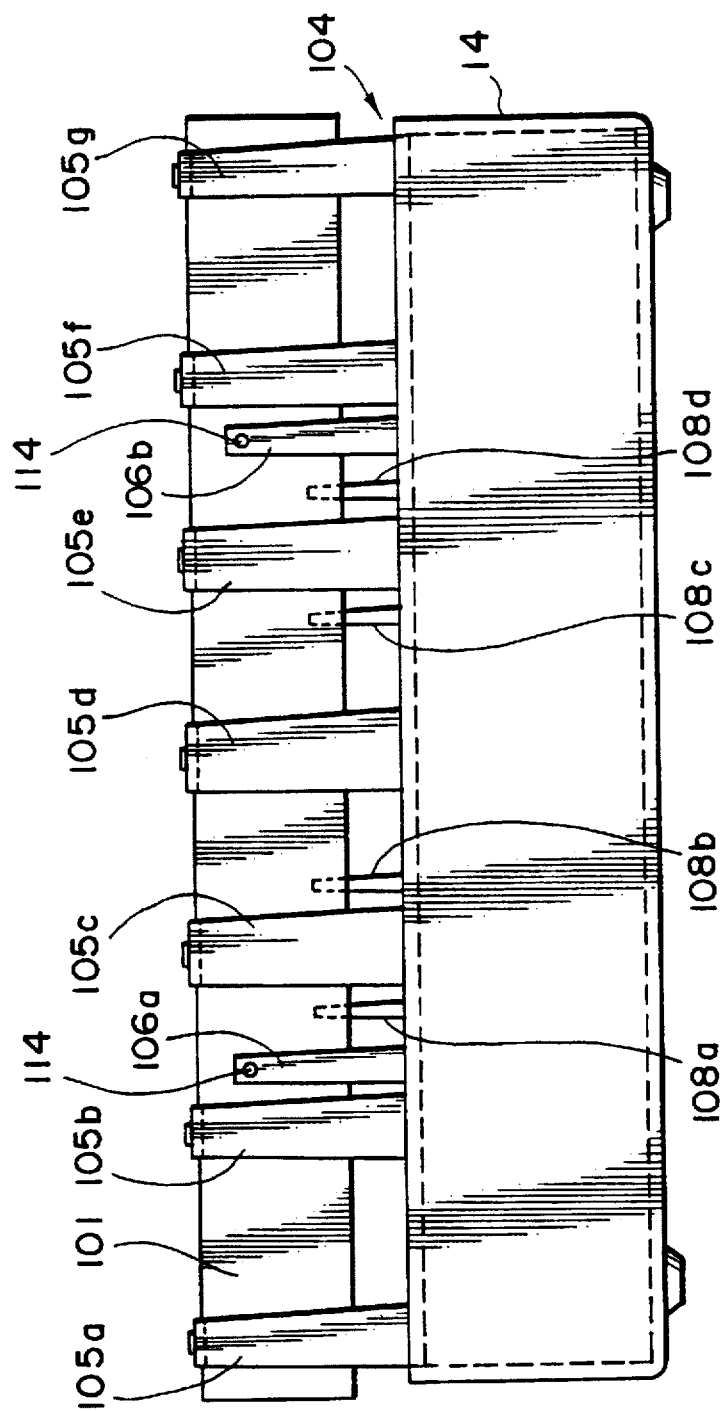
FIG. 3 shows pressing members as viewed from the rear of a record head included in the recording section of FIG. 2.

As shown in FIG. 2, head holding means, generally 104, has a plurality of members 105, 106, 107 and 108 formed integrally with the base 14. As shown in FIG. 3, the head holding means 104 has pressing members 105a-105g, positioning members 106a and 106b, and supporting members 108a-108d. The pressing members 105a-105g each has at the upper end thereof a pawl 109, FIG. 1, which has an inclined end.

The pressing members 105a-105g each has a flat plate-like configuration whose thickness extends in the direction in which a pressure acts between the head 101 and the platen roller 102 (referred to as a pressure direction hereinafter). The members 105a-105g are positioned at predetermined intervals in the widthwise direction (i.e. longitudinal direction) of the head 101. When the head 101 is mounted to a predetermined position where it faces the roller 102, the members 105a-105g elastically deform to the left, as viewed in FIG. 2. After the head 101 has been set at the above-mentioned position, the members 105a-105g are restored to their original positions and urge the head 101 against the roller 102. Specifically, the members 105a-105g are implemented by flat members engaging with the head 101 at their upper ends and elastically deformable about their lower ends. The members 105a-105g form part of the head holding means 104 and, at the same time, play the role of pressing means for pressing the head 101 against the roller 102.

The top cover 16 is formed with stops 16a and 16b for restricting the movement of the pressing members 105a-105 in the pressure direction within a predetermined range. Further, the elastic restoration of the pressing members 105a-105g is preselected in consideration of the deformation of the platen roller 102 such that, when the head 101 and roller 102 are pressed against each other, the pressure becomes substantially uniform at any position in the axial direction of the roller 102.

More specifically, when the head 101 deforms following the deformation of the roller 102, the deformation for producing the pressure sequentially decreases from opposite ends toward the center of the array of pressing members 105a–105g. In light of this, the members 105a and 105g, the members 105 and 105f and the members 105c and 105e which are paired in the right-and-left direction, as viewed in FIG. 3, (axial direction of the roller 102) are respectively positioned symmetrically to each other with respect to the intermediate member 105d. In addition, the width is sequentially increased from the end members 105a and 105g toward the intermediate member 105d. In this configuration, rigidity against the deformation, which produces the pressure, sequentially increases from the end members 105a and 105g toward the center member 105d. Hence, assuming that the head 101 and roller 102 are straight, the pressure is higher at the center than at the opposite ends. The roller 102 is pressed by the forces of the members 105a–105g to deform by a predetermined amount while being supported by the plotter cover 103 at opposite ends thereof. At the same time, the head 101 deforms following the deformation of the roller 102. As a result, the head 101 and roller 102 are pressed against each other by a substantially uniform pressure. Before the head 101 is mounted to the head holding means 104, the upper ends of the members 105a–105g are aligned with each other. Hence, while the plotter cover 103 is open, i.e., while the head 101 and roller 102 are spaced apart from each other, the members 105a–105g do not deform the head 101.

Figure 4:
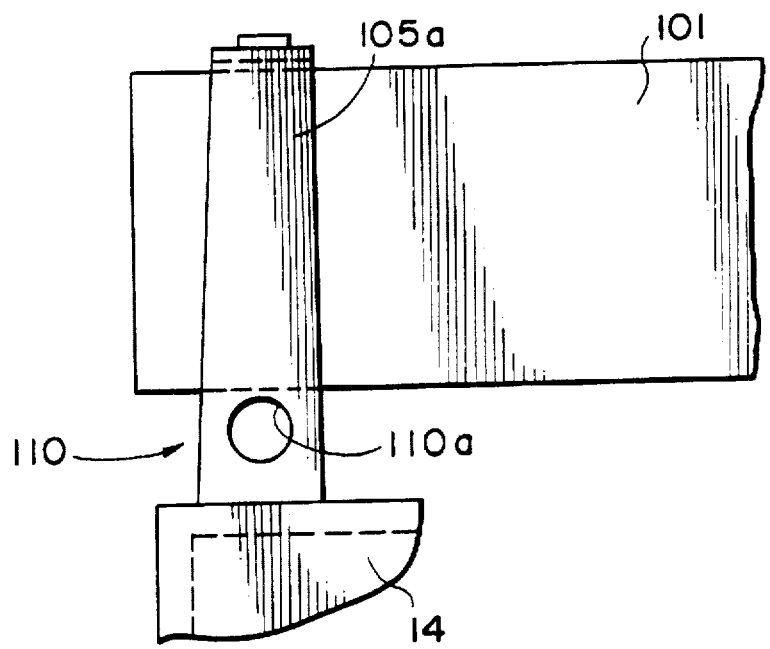
FIGS. 4, 5 and 6 each shows a specific configuration of a deformable portion included in each of the pressing members.
Figure 5:
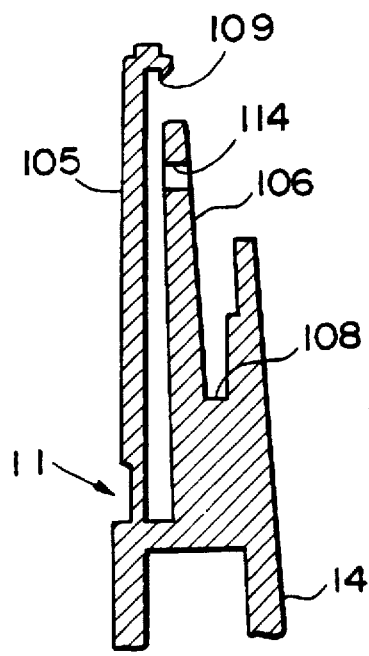
Figure 6:
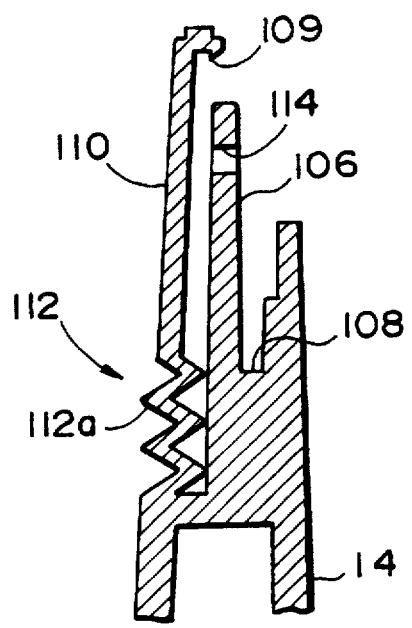

As shown in FIG. 4, the pressing member 105a (as well as the other members 105b–10g) has a deformable portion 110 adjoining the base 14. The deformable portion 110 is formed with at least one hole 110a which is open at opposite ends in the previously mentioned pressure direction or thicknesswise direction. This portion 110, therefore, has a smaller sectional area than the other portion of the member 105a. The deformation for producing the pressure mainly occurs in the deformable portion 110 in a stable manner since the illustrative embodiment provides each of the members 105a–19g with the pawl 109. FIGS. 5 and 6 each shows an alternative implementation for achieving the above object. In FIG. 5, the members 105a–105g each has a deformable portion 111 adjoining the base 14 and thinner than the other portion (as measured in the pressure direction). In FIG. 6, the members 105a–105g each has a deformable portion 112 implemented as at least one bent 112a.

The head 101 is formed with lugs 113 each having a circular section on the rear thereof (on the left side as viewed in FIG. 2). The positioning members 106a and 106b are each formed with a hole 114, FIG. 3, mating with one of the lugs 113 of the head 101. The members 106a and 106a, therefore, position the head 101 in two directions perpendicular to the pressure direction. The holes 114 of the members 113 are positioned such that the lugs 113 of the head 101 are located at the base 14 side with respect to the position where the head 101 and roller 102 contact each other.

The positioning members 106a and 10b cooperate with the pressing members 105a–105g to hold the head 101 in the predetermined position. While the pawls 109 of the pressing members 105a–105g are respectively engaged with an engaging portion 115 protruding from the rear of the head 101, the positioning members 106 and 106b are deformable in the pressure direction to allow the head 101 to move in the same direction. The engaging portion 115 of the head 101 may be formed by, for example, bending part of the previously mentioned head radiation base of the head 101.

The supporting members 108a–108d are generally U-shaped and support the the bottom of the head 101 at a predetermined height. When the head 101 sustained by the support members 108a–108d is angularly moved about the bottom thereof away from the platen roller 102, the pressing members 105a–105g mate with the engaging portion 115 of the head 101.

The head 101 is held by the head holding means 104 at a position in front of the paper holder portion 302. A printed circuit board 116 is positioned in front of the head 101 and also constitute the control circuit of the apparatus 10. The circuit board 116 is electrically connected to the head 101 via a flexible connecting member 117 formed integrally with the head 101, thereby supplying power and drive signals to the head 101. The connecting portion 117 is made up of a flexible printed circuit board 117a and a connector 117b connected thereto. The circuit board 117a is formed integrally with or directly connected to the previously mentioned flexible circuit board built in the head 101. As shown in FIG. 1, an idle gear 118 is held in mesh with the gear of the platen roller 102. The platen roller 102 is driven by a motor 119. A speed reduction gear 120 connects the output shaft of the motor 119 to the idle gear 118. These gears and motor constitute a paper conveying system in cooperation with the platen roller 102.

To mount the head 101 to the head holding means 104, the bottom of the head 101 is set on the supporting members 108a–108d after the plotter cover 103 has been opened or before the cover 103 is mounted to the base 14. This roughly positions the head 101 in the up-and-down direction. Then, the lugs 113 of the head 101 are slightly inserted into the holes 114 of the positioning members 106a and 106b while slightly deforming the pressing members 105a–105g to the left, as viewed in FIG. 2. As a result, the head 101 is positioned in the widthwise direction also. The head 101 is further urged toward the pressing members 105a–105g. This causes the pressing members 105a–105g, as well as the engaging portion 115, to deform such that the inclined ends 109a of the pawls 109 get on the engaging portions 115. Consequently, the engaging portion 115 of the head 101 mates with the pawls 109 of the pressing members 105a–105g. At the same time, the lugs 113 of the head 101 are fully inserted into the holes 114 of the positioning members 106a and 106b, respectively. In this condition, the pressing members 105a–105g and positioning members 106a and 106b cooperate to retain the head 101 in the pressure direction while allowing it to move. That is, the head 101 is held by the head holding means 104. If desired, use may be made of a jig corresponding to the stops 16a and 16b of the top cover 16, or the top cover 16 may be mounted on the base 14 beforehand. Since the plotter cover 103 is open, the pressing members 105a–105g elastically return toward the platen roller 102 within the predetermined range mentioned earlier.

Subsequently, the paper roll 301 is set in the paper holder portion 302. After the leading edge of the paper 301 has been paid out from the roll and positioned on the recording surface of the head 101, the plotter cover 103 is closed. At this instant, the platen roller 102 approaches the head 101, deforming the pressing members 105a–105g. When the platen roller 102 reaches a position where the plotter cover 103 will be locked to the top cover 16, as shown in FIG. 2, a predetermined pressure acts between the head 101 and roller 102 via the paper 301. Specifically, the roller 102 is deformed by a predetermined amount by the forces of the pressing members 105a–105g while being supported at opposite ends thereof. Hence, the head 101 is deformed complementarily to the roller 102. As a result, the head 101 and roller 102 are pressed against each other by a substantially uniform pressure. In this condition, a substantially uniform pressure acts on the head 101 over the entire axial dimension of the roller 102. The head 101, therefore, can record an image on the paper 301 without any irregularity in image density.

In FIG. 2, while the rear of the head 101 is shown as contacting the positioning members 106a and 106b, the former is, in practice, spaced apart from the latter by a small gap, i.e., the positioning members 106a and 106b do not exert any pressure on the head 101. Of course, this will not be the case when the positioning members 106a and 106b play the role of pressing members at the same time.

A reference will be made to FIGS. 7, 8, 9, 10A and 10B for describing the platen roller 102, plotter cover 103 and top cover 16 in detail. As shown, the platen roller 102 is made up of a roller portion 102a to be pressed against the head 101 via the paper 301, and a shaft portion 102b supporting the roller portion 102a and having a gear 122 at one end thereof. The shaft portion 102b and gear 122 are molded integrally with each other by use of resin. A pair of lugs 124 protrude from the outer end 122a of the gear 122 at opposite sides of and parallel to the axis of the platen roller 102. The lugs 124 are also molded integrally with the shaft portion 102b and gear 122 by use of resin. The lugs 124 each has a deformable portion 124a parallel to the axis of the platen roller 102 and elastically deformable in the direction perpendicular to the axis of the roller 102, and an end portion 124b extending from the end of the deformable portion 124a radially outward with respect to the roller 102. The deformable portions 124a are so shaped as to form an imaginary cylinder having a predetermined diameter when edges thereof are extended. Each end portion 124b has a flat surface parallel to the end 122a of the gear 122, and an inclined surface sequentially approaching the flat surface in the radially outward direction. If desired, the shaft 102b portion, gear 122 and lugs 124 may be formed integrally with each other by machining or may be formed by machining metal.

The plotter cover 103 has opposite flat ribs 126 and 127 and a flat retainer rib 128. The opposite ribs 126 and 127 are spaced apart by a distance substantially identical with the length of the shaft portion 102b (as measured from the other end of the shaft 102b to the end 122a of the gear 122). The retainer rib 128 corresponds in position to part of the shaft portion 102b intervening between the roller portion 102a and the gear 122. The rib 126 has a thickness slightly smaller than the axial dimension of the deformable portions 124a (distance between the end 122a of the gear 122 and the flat surfaces of the end portions 124b). A hole 126a is formed through the rib 126 and provided with a slightly greater diameter than the previously mentioned imaginary cylinder of the deformable portions 124a. The side 126b of the rib 126 and the end 122a of the gear 122 each constitutes an abutment. The rib 127 is formed with a hole 127a having substantially the same diameter as the the other end of the shaft portion 102b remote from the gear 122. The rib 127 constitutes a bearing for the platen roller 102.

The lugs 124 are inserted into the hole 126a of the rib 126 by having the deformable portions 124a thereof deformed. Since the rib 126 has a thickness smaller than the axial dimension of the deformable portions 124a, the portions 124a are elastically restored before the end 126a of the gear 122 abuts against the side 126b of the rib 126. Specifically, the rib 126 and the deformable portions 124a are formed such that the axial position of the platen roller 102 which causes the end 122a of the gear 122 to abut against the side 126b of the rib 126 and the axial position which causes the lugs 124 to be elastically restored are slightly different from each other. In this configuration, the end 122a of the gear 122 and the side 126b of the rib 126 and the flat surfaces of the end portions 124b of the lugs 124 restored and the side 126c of the rib 126 abut against each other at different positions in the axial direction of the platen roller 102. As a result, the platen roller 102 is locked to the plotter cover 103 while being restricted in the axial direction thereof.

The retainer rib 128 has a generally U-shaped notch or support portion 128a. When the plotter cover 103 is rotated to cover the paper holder portion 302, the shaft portion 102b of the platen roller 102 is received in the support portion 128a from the side opposite to the head 101. The support portion 128a has a curvature complementary to the periphery of the shaft 102b and concentric with the holes 126a and 127b of the ribs 126 and 127. Since the support portion 128a corresponds in position to the part of the shaft portion 102b intervening between the roller portion 102a and the gear 122, as stated earlier, and since it is generally U-shaped, the shaft portion 102b enters the support portion 128a when the other end of the shaft portion 102b and the lugs 124 are respectively inserted into the holes 127a and 126b. When the roller portion 102a is brought into contact with the head 101, the shaft portion 102b abuts against the support portion 128a so as to support the roller 102. In this manner, the support portion 128a and hole 127a serve as bearings for the roller 102, while the lugs 124 do not contact the rib 126 since hole 126a is greater in diameter than the imaginary cylinder of the deformable portions 124a.

To mount the roller 102 to the plotter cover 103, the end of the shaft portion 102b remote from the gear 122 is inserted into the hole 127a of the rib 127. At the same time, the part of the shaft portion 102b between the gear 122 and the roller portion 102a is inserted into the support portion 128a of the rib 128. Then, the roller 102 is moved to the right, as viewed in FIG. 8, (i.e. to one side in the axial direction). As a result, the lugs 124 deform with the inclined surfaces of their end portions 124b sliding on the edge of the hole 126a of the rib 126. More specifically, the deformable portions 124a of the lugs 124 deform toward each other in the direction perpendicular to the axis of the roller 102. Consequently, the end portions 124b are passed through the hole 126a. Then, the lugs 124 are elastically restored away from each other. In this condition, the roller 102 is rotatably supported by the hole 127a and the support portion 128a, i.e., locked to the plotter cover 103. The axial movement of the platen roller 102 is restricted in one direction (rightward in FIG. 9) when the end 122a of the gear 122 abuts against the side 126b of the rib 126 and restricted in the other direction (leftward in FIG. 9) when the flat surfaces of the end portions 124b of the lugs 124 abut against the side 126c of the rib 126.

Figure 10A:
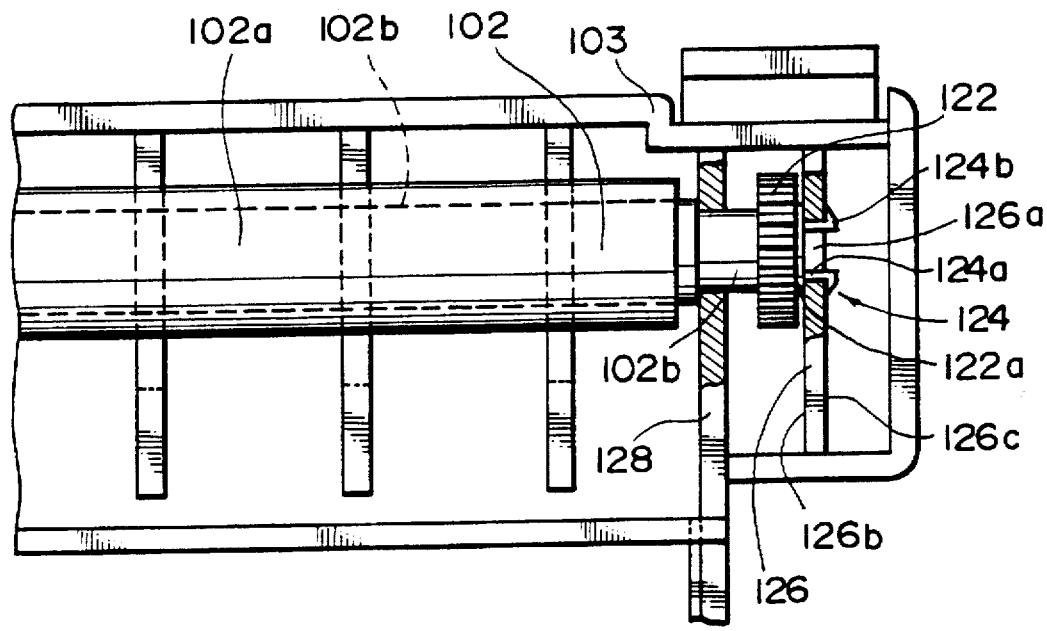
FIGS. 10A and 10B are fragmentary sections showing opposite end portions of the platen roller mounted on the plotter cover.
Figure 10B:
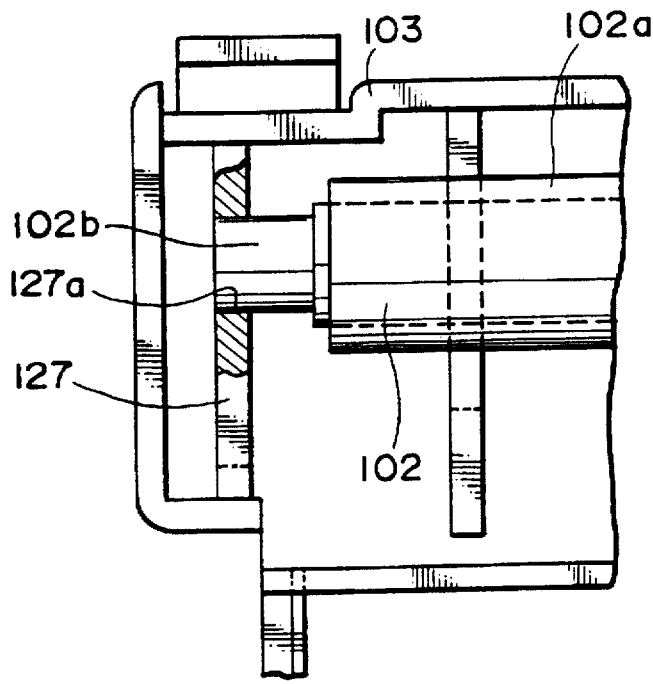
Figure 11:
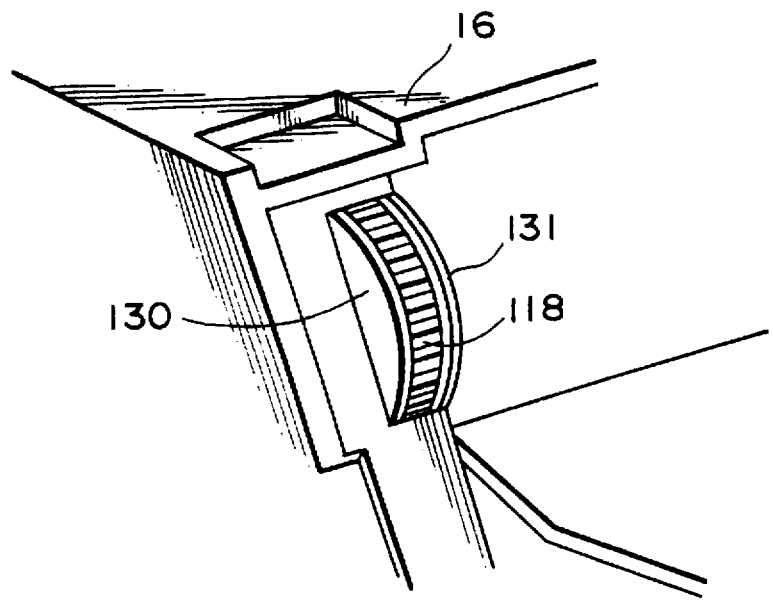
FIGS. 11-13 each shows a modified form of the embodiment.
Figure 12:
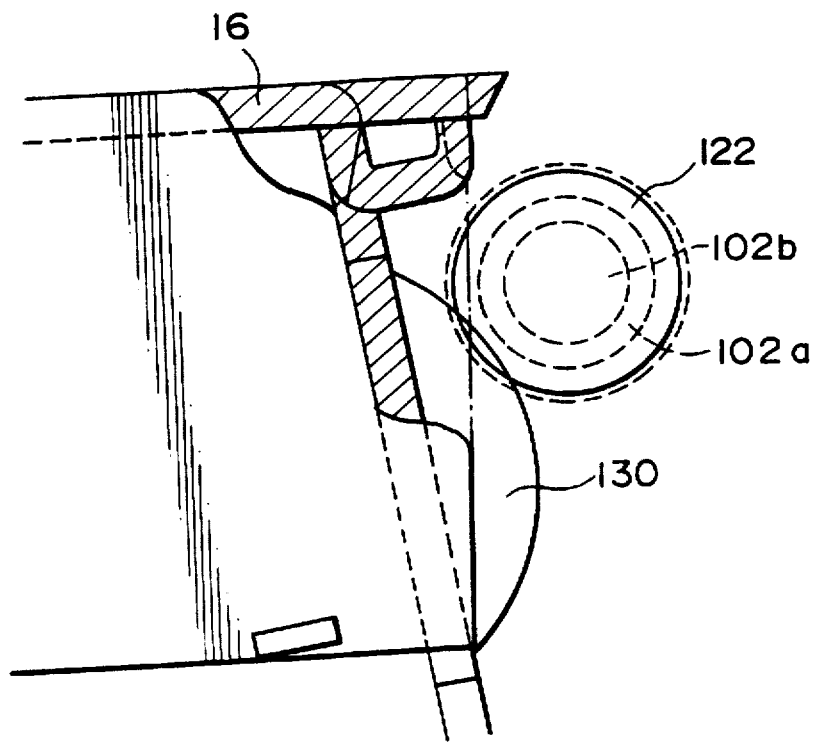

As shown in FIG. 11, a pair of flat positioning portions 130 and 131 protrude from the top cover 16 and respectively face the opposite ends of the idle gear 118. As shown in FIG. 12, when the platen roller 102 is held in pressing contact with the head 101, the positioning portions 130 and 131 extend toward the roller 102 beyond the teeth of the idle gear 118 in the radial direction of the gear 118, thereby sufficiently enclosing the teeth of the gear 118. Also, the portions 130 and 131 respectively abut against the opposite ends 122a and 122b (122b is shown in FIG. 10A) of the gear 122. The portions 130 and 131 position the roller 102 relative to the base 14 in the axial direction of the roller 102 and, therefore, relative to the head 101. At the same time, the portions 130 and 131 reduce the load which acts on the end portions 124b of the lugs 124. This allows the rigidity of the lugs 124 to be reduced in the radial direction of the imaginary circle and, therefore, facilitates the mounting of the platen roller 102. Further, the portions 130 and 131, enclosing the teeth of the idle gear 118, protect the teeth when the plotter cover 103 is opened to uncover the paper holder portion 302.

Figure 13:
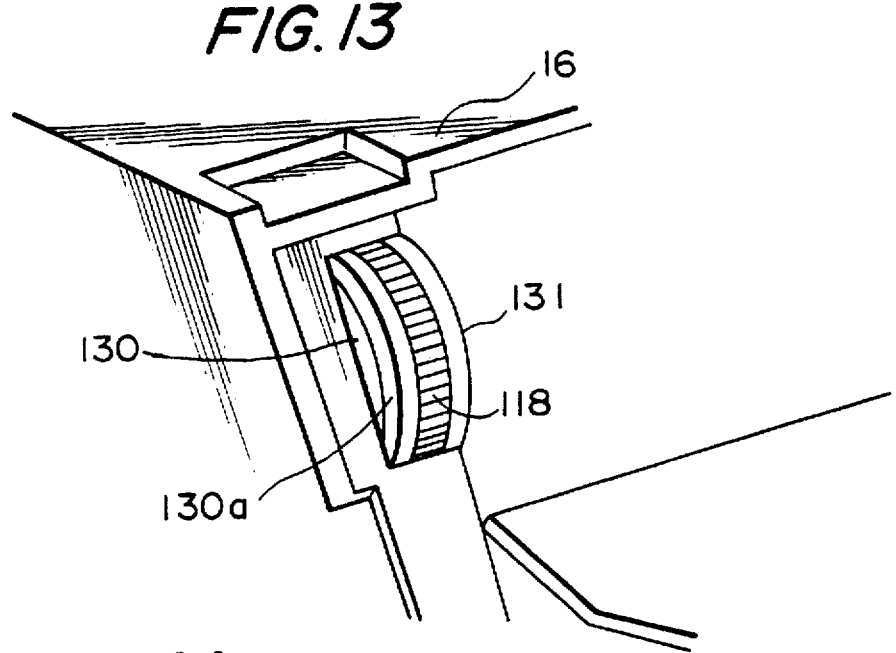

As shown in FIG. 13, the edges of the positioning portions 130 and 131 may be chamfered, as at 130a and 131a (only 131a is visible). When the plotter cover 103 is rotated to uncover the paper holder portion 302, the chamfered edges 130 and 131 will protect the operator's hand from an injury.

Figure 7:
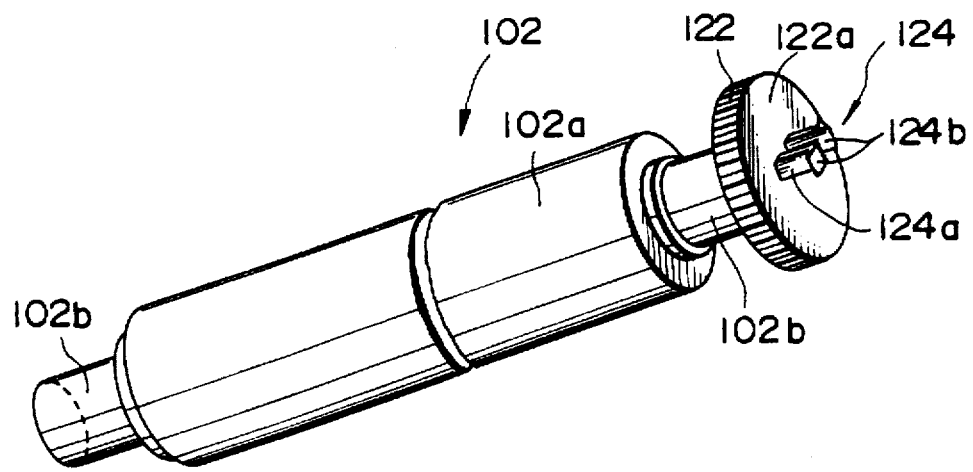
FIG. 7 is a perspective view of a platen roller included in the recording section of the embodiment.
Figure 8:
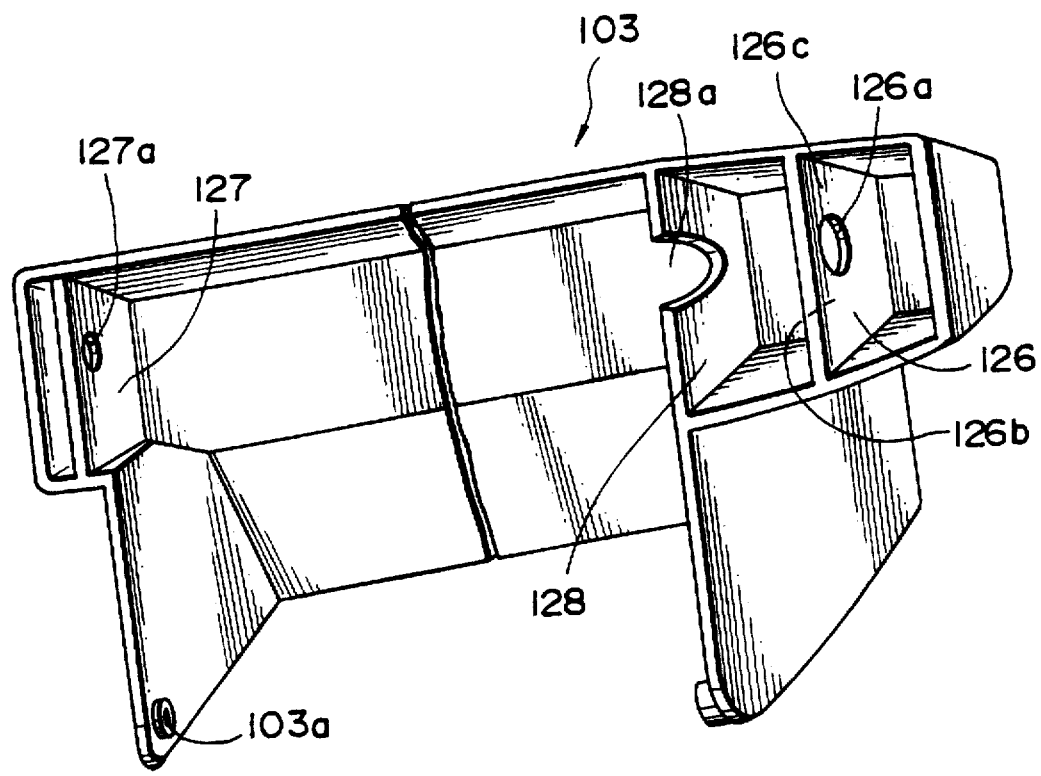
FIG. 8 is a perspective view of a plotter cover also included in the recording section.
Figure 9:
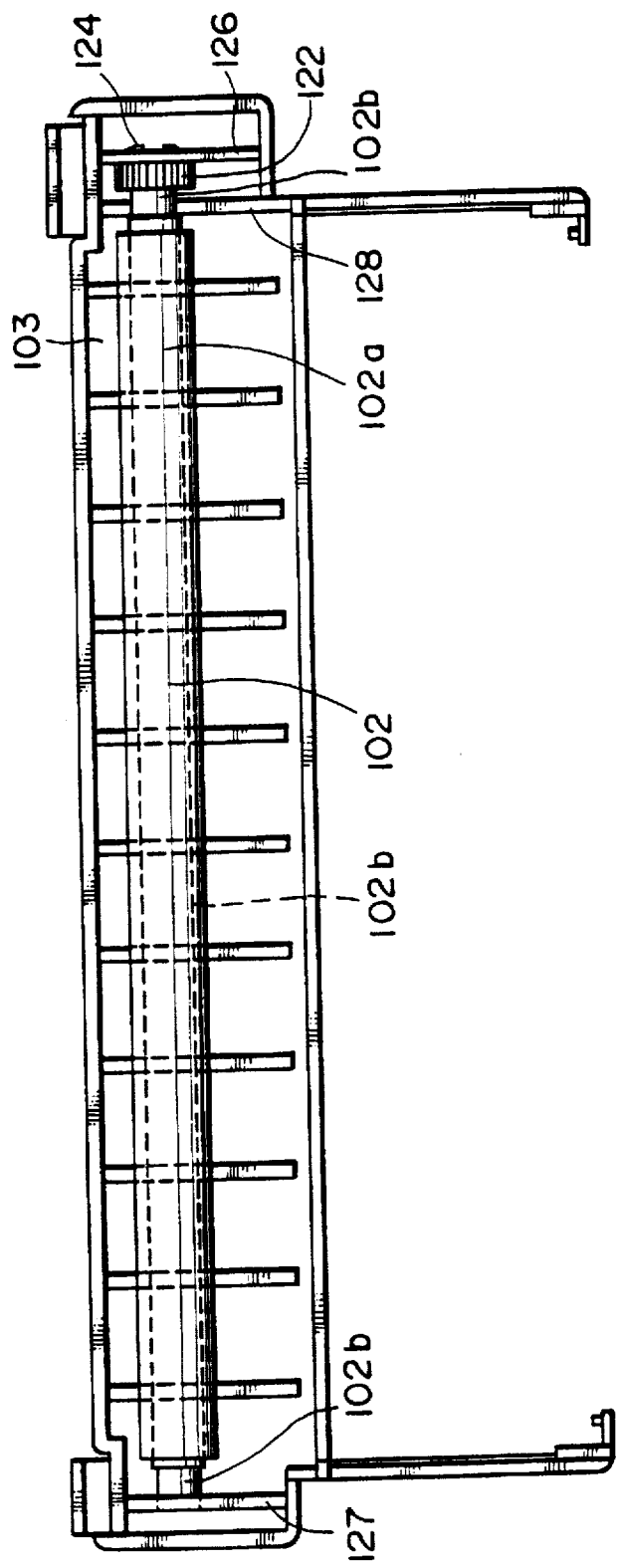
FIG. 9 is a plan view showing the platen roller mounted on the plotter cover.
Figure 14A:
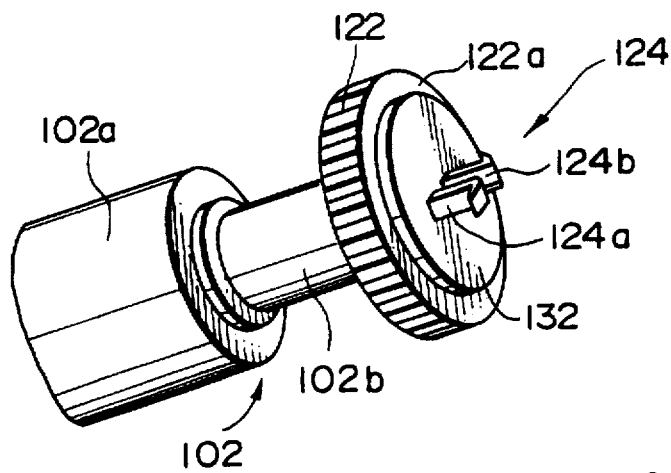
FIGS. 14A and 14B are perspective view showing a modified form of the platen roller.
Figure 14B:
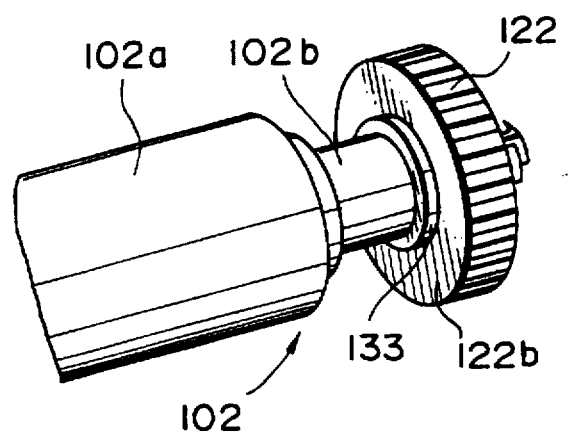

FIGS. 14A and 14B show a modified form of the platen roller 102 described with reference to FIG. 7. As shown, disk-like projections 132 and 133 are respectively formed on the opposite ends 122a and 122b of the gear 122, and each has a predetermined thickness. In this case, the positioning portions 130 and 131, not shown, are spaced apart from each other in such a manner as to accommodate the total thickness of the projections 132 and 133. Hence, the edges of the portions 130 and 131 are prevented from contacting the teeth of the gear 122. Since the projections 132 and 133 are disk-shaped, they are prevented from being caught by the edges of the positioning portions 130 and 131. In this condition, the projections 132 and 133 do not obstruct the rotation of the platen roller 102 at all.

Figure 15:
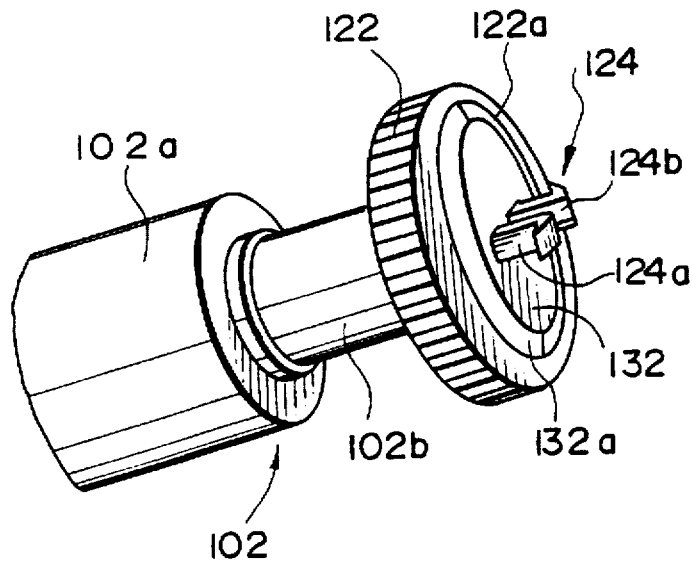
FIG. 15 is a perspective view showing another modified form of the platen roller.

FIG. 15 shows another modified form of the platen roller 102. As shown, the projections 132 and 133 provided on the opposite ends 122a and 122b of the gear 122 respectively include chamfered portions 132a and 133a (only 132a is visible). In this configuration, when the plotter cover 103 is rotated to cover the paper holder portion 302, the positioning portions 130 and 131 respectively abut against the the ends 122a and 122b of the gear 122, sliding on the chambered portions 132a and 133a. This allows the plotter cover 103 to be moved until the idle gear 118 and gear 122 fully mesh with each other, while preventing the projections 132 and 133 from abutting against the ends of the positioning portions 130 and 131. Alternatively, the inner edges of the positioning portions 130 and 131 may be chamfered, if desired.

While the platen roller 102 has been shown and described as being rotatably supported by the hole 127a and support portion 128a, it may be supported only by a pair of holes. Further, the flexible lugs 124 may be provided on the plotter cover 103, in which case the platen roller 102 will be provided with a portion engageable with the lugs 124.

In the illustrative embodiment, the pressing members 105a–105g are molded integrally with the base 14 by use of resin in order to simplify the arrangement around the head 101. Alternatively, the pressing members, or at least three pressing members, 105a–105g may be implemented as metallic leaf springs or coil springs or even as rubber or similar elastic members which are either integral with or independent of each other. Of course, independent pressing members may be tied together by a connecting member extending in the axial direction of the platen roller 102. Further, pressing members which begin to deform earlier than the intermediate pressing member may be mounted on opposite sides of the intermediate member and supported together at a single point. Even with this configuration, it is possible to preselect the pressure such that when the head 101 and roller 102 are straight, the pressure is higher at the center than at the opposite ends. The crux is that pressing means having some pressing portions each having a particular pressing characteristic be provided. How the pressure should be applied is not an issue so long as the roller 102 and head 101 are pressed substantially uniformly against each other.

The recording section 100 described above has various advantages, as enumerated below.

(1) The head holding means 104 has a plurality of members formed integrally with the base 14, i.e., the pressing members 105a–15g playing the role of locking members at the same time, positioning members 106a and 106b, and supporting members 108a–108d. The head supporting means 104 supports the head 101 such that the head 101 is movable toward and away from the platen roller 102. Therefore, extra members for supporting the head 101 and independent of the base 14 are not necessary.

(2) When the head 101 is mounted to the apparatus, the pressing members 105a–105g deform and urge the head 101 toward the platen roller 102. This makes it needless to provide means for urging the head 101 toward the roller 102 and independent of the base 14. Since the pressing members 105a–105g play the role of members for elastically press the head 101, the arrangement around the head 101 is further simplified.

(3) The head 101 held by the head holding means 104 at a position in front of the paper holder portion 302 and the printed circuit board 116 positioned in front of the head 101 are electrically connected to each other by the flexible connecting member 117 which is formed integrally with the head 101. Hence, an independent connecting member does not have to be provided between the head 101 and the printed circuit board 116, so that the arrangement around the head 101 is even more simplified.

(4) The pressing members 105a–105g each has the deformable portion 110 (111 or 112) adjoining the base 14 and having a smaller sectional area than the other portion. Hence, despite that the pressing members 105a–15g are simple in configuration, an adequate degree of deformation is readily achievable. It is, therefore, easy to cause the members 105a–15g to play the role of locking members.

(5) The positioning members 106a and 106b respectively mate with the lugs 113 of the head 101 to position the head 101 in two directions perpendicular to the pressure direction. This eliminates the need for extra members for positioning the head 101 and insures accurate positioning of the platen roller 102 in the axial. In addition, since the pressing members 105a–105g are implemented as plates whose thicknesswise direction is coincident with the pressure direction, they are scarcely deformable when subjected to forces in the other directions. These, in combination, allow the head 101 to move in the pressure direction without any deviation, despite the simple arrangement.

(6) The lugs 113 of the head 101 are closer to the base 14 side than the position where the head 101 and platen roller 102 contact each other. Hence, the dimension of the lugs 113, as measured from the rear of the head 101, can be small relative to the displacement of the head 101 toward the roller 102. Such lugs 113, therefore, can be easily implemented by, for example, shaping the heat radiation base of the head 101 (made of metal).

(7) The pressing members, or locking members, 105a–105g mate with the engaging portion 115 of the head 101 and hold the head 101 in cooperation with the positioning members 106a and 106b. This, coupled with the fact that the members 105a–105g deform in the pressure direction so as to allow the head 101 to move, prevents the members 105a–15g from protruding toward the platen roller 102 side of the head 101 and interfering with the paper conveying system or from being damaged.

(8) Since the supporting members 108a–108d sustain the head 101, the head 101 can be roughly positioned with ease in the event of assembly. This facilitates the assembly of the head 101. Moreover, when the head 101 sustained by the support members 108a–108d moves about the bottom thereof away from the platen roller 102, the pressing members or locking members 105a–105g mate with the engaging portion 115 of the head 101. Therefore, the head 101 can be easily assembled only if it is move in such a direction. As a result, the operation for locking the head 10 to the base 14 is noticeably simplified.

(9) The array of at least three elastically deformable pressing members 105a–105g, exerting a greater pressure force at the center than at opposite ends as stated earlier, causes the platen roller 102 to deform by a predetermined amount while being supported at opposite ends thereof. At the same time, the head 10 deforms, following the deformation of the roller 102. As a result, the head 101 is pressed against the roller 102 by a substantially uniform pressure in the axial direction of the roller 102, thereby preventing image density from becoming irregular.

(10) The width sequentially increases from the opposite pressing members 105a and 105g to the intermediate pressing member 105d. Therefore, the pressing members 105a–105g can be formed integrally with the base 14 despite that they each has a particular pressing characteristic.

(11) The stops 16a and 16b limit the displacement of the head 101 toward and away from the platen roller 102. This prevents the head 101 and pressing members 105a–105g from deforming excessively and, therefore, prevents the functions of the apparatus from being lowered.

(12) The platen roller 102 has the lugs 124 and the end remote from the lugs 124 easily inserted into the holes 126a and 127a and is restricted in the axial direction by the gear 122, lugs 124, and rib 126. Hence, the roller 102 can be easily mounted to the plotter cover 103 and does not need conventional restricting members (e.g. E-rings) or conventional procedures (notching, assembling and so forth).

(13) The lugs 124 are provided on one end 122a of the gear 122 and molded integrally with the gear 122 and the shaft portion 102b use of resin. This facilitates the assembly by eliminating errors ascribable to the dimensions of individual parts. In addition, the gear 122 does not need any part (e.g. screw) or extra work (e.g. milling) for assembly, so that restrictions on dimensional accuracy and management are eased.

(14) The shaft portion 102b is easily received in the U-shaped support portion 128a, and the roller portion 102 is prevented from moving due to the deformation of the lugs 124 which are inserted in the hole 126a. Further, the shaft portion 102b is rotatably supported by the hole 127a and support portion 128a at opposite ends thereof, thereby reducing the deformation of the roller portion 102a. Hence, the platen roller 102 can be rotatably supported without resorting to bearings or similar extra parts.

(15) The curvature of the U-shaped support portion 128a and the diameter of the hole 127a are substantially the same as the diameter of the shaft portion 102b. The diameter of the hole 127a is greater than the diameter of the imaginary cylinder defined by the deformable portions 124a. Further, the support portion 128a is concentric with the holes 126a and 127a. The lugs 124, therefore, do not contact the rib 126. In this condition, the platen roller 102 is rotatably supported by the hole 127a and support portion 128a. Should the roller 102 be supported at three points thereof, undesirable loads would act in the radial direction of the roller 102 and deform the roller 102 in the axial direction. This eases the restrictions on accuracy in the concentricity of the holes 126a and 127a and support portion 128a and, therefore, in dimensions and management, while allowing the rigidity of the lugs 124 to be reduced in the radial direction.

(16) The rib 126 has a thickness smaller than the axial dimension of the deformable portions 124a. The end 122a of the gear 122 abuts against the side 126b of the rib 126 when the platen roller 102 is moved to a particular position in the axial direction thereof. On the other hand, the lugs 124 are elastically restored when the roller 102 is moved to another particular position. Under these conditions, the end 122a of the gear 122 and the end portions 124b of the lugs 124 are prevented from respectively abutting against the sides 126b and 126c of the rib 126 at the same time; otherwise, the rotation of the roller 102 would be obstructed. This again eases restrictions on dimensional accuracy and management and, therefore, reduces cost.

(17) Since the shaft portion 102b and gear 122 are molded integrally with each other, the roller platen 102 suffers from a minimum of play and backlash.

(18) The gear 122 has an outside diameter smaller than that of the roller portion 102a and, therefore, lies within the imaginary axial extension of the periphery of the roller portion 102a. Hence, the periphery of the roller portion 102a can be easily ground or otherwise machined without resorting to a jig or similar special implement and can, therefore, be postprocessed with ease.

[2] Reading Section 200

Referring again to FIG. 1, the reading section has a scanner section 201 for reading a document image and having a conventional construction. A document is laid on a glass platen 202. An LED (Light Emitting Diode) array 203 illuminates the document via the glass platen 202. A CCD (Charge Coupled Device) image sensor 204 photoelectrically transforms the resulting reflection from the document incident thereto by way of mirrors 205a–205c. A white conveyor roller 206 is pressed against the glass platen 202 via the document. A scanner motor 207 drives the conveyor roller 206. A speed reduction gear 208a and an idle gear 208b operatively connect the output shaft of the scanner motor 207 to the conveyor roller 207. A conventional read sensor 209 reads the document laid on the glass platen 202 in contact therewith. The conveyor roller 206 is rotatably mounted on a scanner cover 210 via a gear 211 (FIG. 16) which is mounted on one axial end of the roller 206.

The conveyor roller 206 is rotatable in contact with the read sensor 209 with the intermediary of the document, thereby conveying the document. The scanner cover 210 is hinged to the top cover 16 at a fulcrum 210a. When the scanner cover 210 is rotated about the fulcrum 210a in the right-and-left direction, as viewed in FIG. 1, the conveyor roller 206 is selectively moved toward or away from the top 209a of the read sensor 209 so as to cover or uncover the read sensor 209. When the scanner cover 210 is closed, it is locked to the top cover 16. The read sensor 209 is deformable within a predetermined range in the direction perpendicular to the main and subscanning directions (up-and-down direction as viewed in the figure, although not shown specifically). Specifically, when the scanner cover 210 is locked to the top cover 16, the conveyor roller 206 is urged against the read sensor 209 by a predetermined pressure exerted by pressing members which will be described. As a result, the read sensor 209 is deformed by a predetermined amount in the direction perpendicular to the axis of the conveyor roller 206. Further, when the scanner cover 201 is locked to the top cover 16, the gear 211 provided on one end of the conveyor roller 206 is brought into mesh with the idle gear 208b which is driven by the scanner motor 207 via the speed reduction gear 208a. These members, therefore, constitute a document conveying system.

A reference will be made to FIGS. 16, 17, 18, 19A and 19B for describing the conveyor roller 206 and scanner cover 210 specifically. As shown, the conveyor roller 206 is made up of a roller portion 206a to be pressed against the top 209a of the read sensor 209 via the document, and a shaft portion 206b supporting the roller portion 206a and having a gear 211 at one end thereof. The shaft portion 206b and gear 211 are molded integrally with each other by use of resin, so that the roller portion 206 is deformable within a predetermined range perpendicularly to the axis thereof. A pair of lugs 212 protrude from the outer end 211a of the gear 211 at opposite sides of and parallel to the axis of the roller 206. The lugs 212 are also molded integrally with the shaft portion 206b and gear 122 by use of resin. The lugs 212 each has a deformable portion 212a parallel to the axis of the roller 206 and elastically deformable in the direction perpendicular to the axis of the roller 206, and an end portion 212b extending from the end of the deformable portion 212a radially outward with respect to the roller 206. The deformable portions 212a are so shaped as to form an imaginary cylinder having a predetermined diameter when edges thereof are extended. Each end portion 212b has a flat surface parallel to the end 211a of the gear 211, and an inclined surface sequentially approaching the flat surface in the radially outward direction. If desired, the shaft portion 206b, gear 211 and lugs 212 may be formed integrally with each other by machining or may be formed by machining metal.

The scanner cover 210 has opposite flat ribs 213 and 214 and a flat retainer rib 215. The opposite ribs 213 and 214 are spaced apart by a distance substantially identical with the length of the shaft portion 206b (as measured from the other end of the shaft portion 206b to the end 211a of the gear 211). The retainer rib 215 corresponds in position to part of the shaft portion 206b intervening between the roller portion 206a and the gear 211. The rib 213 has a thickness slightly smaller than the axial dimension of the deformable portions 212a (distance between the end 211a of the gear 211 and the flat surfaces of the end portions 212b). A hole 213a is formed through the rib 213 and provided with a slightly greater diameter than the previously mentioned imaginary cylinder of the deformable portions 212a. The side 213b of the rib 213 and the end 211a of the gear 211 each constitutes an abutment. The rib 214 is formed with a hole 214a having substantially the same diameter as the the other end of the shaft portion 206b. The rib 214 constitutes a bearing for the roller 206.

The lugs 212 are inserted into the hole 213a of the rib 213 by having the deformable portions 212a thereof deformed. Since the rib 213 has a thickness smaller than the axial dimension of the deformable portions 212a, the portions 212a are elastically restored before the end 211a of the gear 211 abuts against the side 213b of the rib 213. Specifically, the rib 213 and deformable portions 211a are formed such that the axial position of the roller 206 which causes the end 211a to abut against the side 213b and the axial position which causes the lugs 212 to be elastically restored are slightly different from each other. In this configuration, the end 211a of the gear 211 and the side 213b of the rib 213 and the flat surfaces of the end portions 212b of the lugs 212 restored and the side 213c of the rib 213 abut against each other at different positions in the axial direction of the conveyor roller 206. As a result, the roller 206 is locked to the scanner cover 210 while being restricted in the axial direction thereof.

The retainer rib 215 has a generally U-shaped notch or support portion 215a. When the scanner cover 210 is rotated to cover the top 209a of the read sensor 209, the shaft 206b portion of the roller 206 is received in the support portion 215a from the side opposite to the top 209a. The support portion 215a has a curvature complementary to the periphery of the shaft portion 206b and concentric with the holes 213a and 214a of the ribs 213 and 214. Since the support portion 215a corresponds in position to the part of the shaft portion 206b intervening between the roller portion 206a and the gear 211 and since it is generally U-shaped, the shaft portion 206b enters the support portion 215a when the other end of the shaft portion 206b and the lugs 212 are respectively inserted into the holes 214a and 213a. When the roller portion 206a is brought into contact with the top 209a of the read sensor 209, the shaft portion 206b abuts against the support portion 215a so as to support the roller 206. In this manner, the support portion 215a and hole 214a serve as bearings for the roller 206, while the lugs 212 do not contact the rib 213 since the hole 213a is greater in diameter than the imaginary cylinder of the deformable portions 212a.

Figure 20:
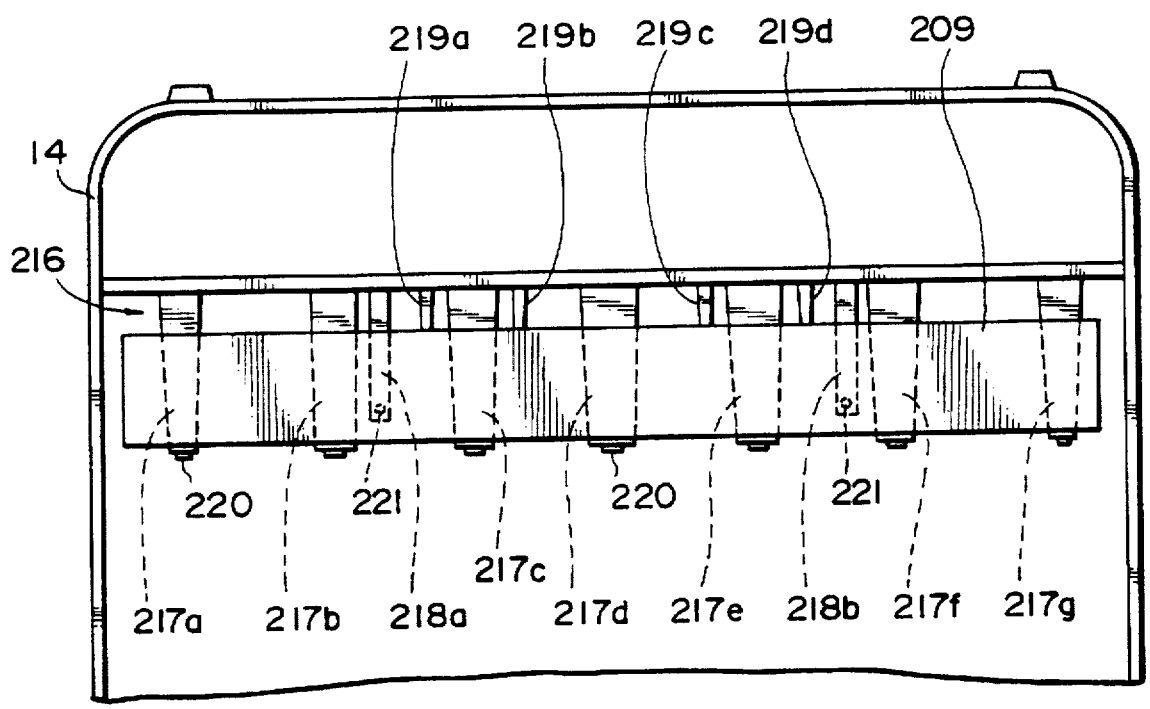
FIG. 20 is a plan view of pressing means included in the reading section.
Figure 21:
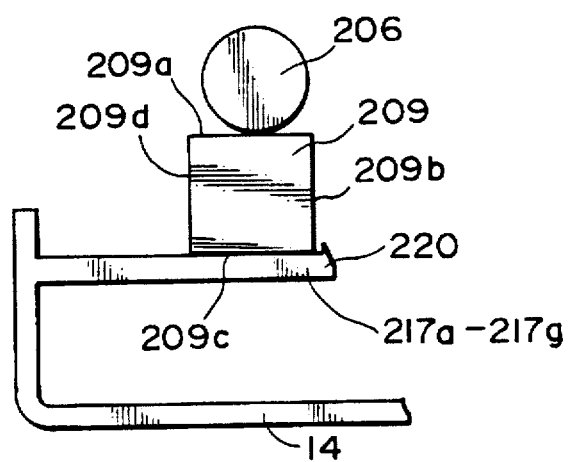
FIG. 21 is a side elevation of the pressing means.

As shown in FIGS. 20 and 21, sensor holding means, generally 216, has pressing members 217a–217g, positioning members 218a and 218b, and supporting members 219a–219d. The pressing members 217a–217g each has at the upper end thereof a pawl 220 engageable with the side 209b of the read sensor 209. The positioning members 218a and 218b are each formed with a hole 221 which slidably mates with a lug formed on the bottom 209c of the read sensor 209 and having a circular cross-section. The sensor holding means 216 holds the read sensor 209 with the supporting portions 219a–219d abutting against the side 209d of the sensor 209 and with the pawls 220 of the pressing members 217a–217g engaging with the side 209b of the sensor 209. At the same time, the holes 221 of the positioning members 218a and 218b respectively mate with the lugs of the read sensor 209, thereby positioning the sensor 209 in two directions perpendicular to the pressure direction.

The pressing members 217a–217g each has a flat plate-like configuration whose thickness extends in the pressure direction. The members 217a–217g are positioned at predetermined intervals in the widthwise direction (i.e. longitudinal direction) of the read sensor 209. When the read sensor 209 is mounted to a predetermined position where it faces the conveyor roller 206, the members 217a–217g elastically deform downward, as viewed in FIG. 21. After the sensor 209 has been set at the above-mentioned position, the members 217a–217g are restored to their original positions and urge the sensor 209 against the roller 206. Specifically, the members 217a–217g are implemented by flat members engaging with the sensor 209 at their free ends and elastically deformable about their lower or base ends. The members 217a–217g form part of the sensor holding means 216 and, at the same time, play the role of pressing means for pressing the sensor 209 against the roller 206. The pressing members 217a–217g and positioning members 218a and 218b deform in the pressure direction to hold the sensor 209 in cooperation while allowing the sensor 209 to be displaced in the same direction. While the positioning members 218a and 218b do not exert a pressure on the sensor 209, they may also play the role of pressing members, if desired.

The pressure to be exerted by the pressing members 217a–217g is preselected in consideration of the deformation of the read sensor 209 and conveyor roller 206 to occur after mounting, such that when the sensor 209 and roller 206 are pressed against each other, the pressure becomes substantially uniform at any position in the axial direction of the roller 206. More specifically, when the sensor 209 deforms following the deformation of the roller 206, the deformation for producing the pressure sequentially decreases from opposite ends toward the center of the array of pressing members 217a–217g. In light of this, the members 217a and 217g, the members 217b and 217f and the members 217c and 217e which are paired in the right-and-left direction are respectively positioned symmetrically to each other with respect to the intermediate member 217d. In addition, the width is sequentially increased from the end members 217a and 217g toward the intermediate member 217d. In this configuration, rigidity against the deformation, which produces the pressure, sequentially increases from the end members 217a and 217g toward the center member 217d. Hence, assuming that the sensor 209 and roller 206 are straight, the pressure is higher at the center than at the opposite ends. The roller 206 is pressed by the forces of the members 217a–217g to deform by a predetermined amount while being supported by the scanner cover 210 at opposite ends thereof. At the same time, the sensor 209 deforms following the deformation of the roller 206. As a result, the sensor 209 and roller 206 are pressed against each other by a substantially uniform pressure.

Before the read sensor 209 is mounted to the sensor holding means, the upper ends of the members 217a–217g are aligned with each other. Hence, while the scanner cover 210 is open, i.e., while the sensor 209 and roller 206 are spaced apart from each other, the members 217a–217g do not deform the sensor 209. The pressing members 217a–217g each has a deformable portion adjoining the base end thereof so as to produce the pressure stably there, although not shown in the figures. The deformable portion may be implemented as at least one hole which is open at opposite ends in the previously mentioned pressure direction or thicknesswise direction, a portion thinner than the other portion (as measured in the pressure direction), or spring-like projections and recesses.

To mount the conveyor roller 206 to the scanner cover 210, the end of the shaft portion 206b remote from the gear 211 is inserted into the hole 214a of the rib 214. At the same time, the part of the shaft 206b between the gear 211 and the roller portion 206a is inserted into the support portion 215a of the rib 215. Then, the conveyor roller 206 is moved to the left, as viewed in FIG. 17, (i.e. to one side in the axial direction). As a result, the lugs 212 deform with the inclined surfaces of their end portions 212b sliding on the edge of the hole 213a of the rib 213. More specifically, the deformable portions 212a of the lugs 212 deform toward each other in the direction perpendicular to the axis of the roller 206. Consequently, the end portions 212b of the lugs 212 are passed through the hole 213a. Then, the lugs 212 are elastically restored away from each other to the position shown in FIGS. 18 and 19A. In this condition, the roller 206 is rotatably supported by the hole 214a and support portion 215a. The axial movement of the roller 206 is restricted in one direction (leftward in FIG. 18) when the end 211a of the gear 211 abuts against the side 213b of the rib 213 and restricted in the other direction (rightward in FIG. 18) when the flat surfaces of the end portions 212b of the lugs 212 abut against the side 213c of the rib 213.

After the read sensor 209 has been positioned by the sensor holding means 216, the scanner cover 210 is rotated and locked to the top cover 16 while pressing the conveyor roller 206 against the read sensor 209. Specifically, as the roller 206 approaches the sensor 209, the pressing members 217a–217g deform. When the roller portion 206 reaches the position shown in FIG. 1 where the scanner cover 210 is locked to the top cover 16, a predetermined pressure for nipping a document is generated between the sensor 209 and the roller 206. That is, the pressure exerted by the pressing members 217a–217g causes the roller 206 to deform by a predetermined amount while being supported at both ends thereof. The sensor 209 deforms following the deformation of the roller 206. In this condition, the top 209a of the sensor 209 and the roller portion 206a are pressed against each other by a substantially uniform pressure. As a result, a substantially uniform pressure acts on the sensor 209 over the entire axial dimension of the roller 206. This prevents a document from skewing and allows the sensor 209 to read the document with accuracy.

Figure 22:
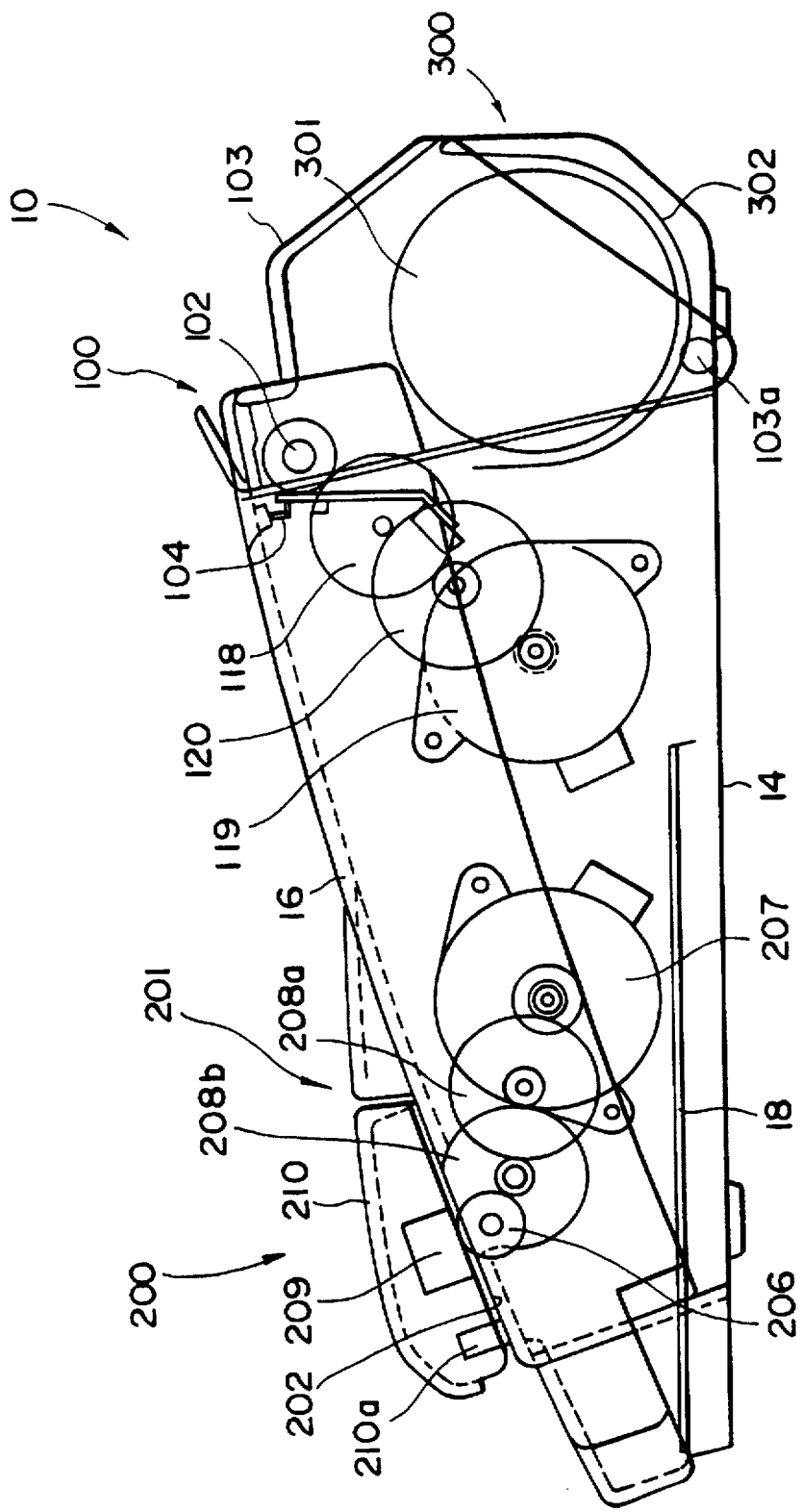
FIGS. 22-24 show an alternative configuration of the reading section.

FIG. 22 shows an alternative arrangement wherein the sensor holding means 216 and conveyor roller 206 are mounted on the scanner cover 210 and base 14, respectively. In this case, the read sensor 209 is disposed above the roller 206, and a document is conveyed face up.

The gear 211 may be provided with an outside diameter smaller than that of the roller portion 206a so as to lie within the imaginary axial extension of the periphery of the roller portion 206a. Then, the periphery of the roller portion 206a can be easily ground or otherwise machined without resorting to a jig or similar special implement and can, therefore, be postprocessed with ease.

In the illustrative embodiment, the lugs 212 extend from one end of the conveyor roller 206 and elastically deform inward in contact with the edge of the hole 213a of the scanner cover 210. Alternatively, such a deformable locking portion may be so configured as to be opened by a projection formed on the scanner cover 210 and then retained thereby when elastically restored. The deformable locking portion may even be provided on the scanner cover 210. The crux is that a deformable locking portion be provided on one of the conveyor roller 206 and scanner cover and engageable with a retaining portion provided on the other. While the roller 206 has been shown and described as being supported by the hole 214a and support portion 215a, it may be supported only by a pair of holes.

In the illustrative embodiment, the pressing members 217a–217g are molded integrally with the base 14 by use of resin in order to simplify the arrangement around the read sensor 209. Alternatively, the pressing members, or at least three pressing members, 217a–217g may be implemented as metallic leaf springs or coil springs or even as rubber or similar elastic members which are either integral with or independent of each other. Of course, independent pressing members may be tied together by a connecting member extending in the axial direction of the conveyor roller 206. Further, pressing members which begin to deform earlier than the intermediate pressing member may be mounted on opposite sides of the intermediate member and supported together at a single point. Even with this configuration, it is possible to preselect the pressure such that when the sensor 209 and roller 206 are straight, the pressure is higher at the center than at the opposite ends. The crux is that pressing means having some pressing portions each having a particular pressing characteristic be provided. How the pressure should be applied is not an issue so long as the roller 206 and sensor 209 are pressed substantially uniformly against each other.

Figure 23:
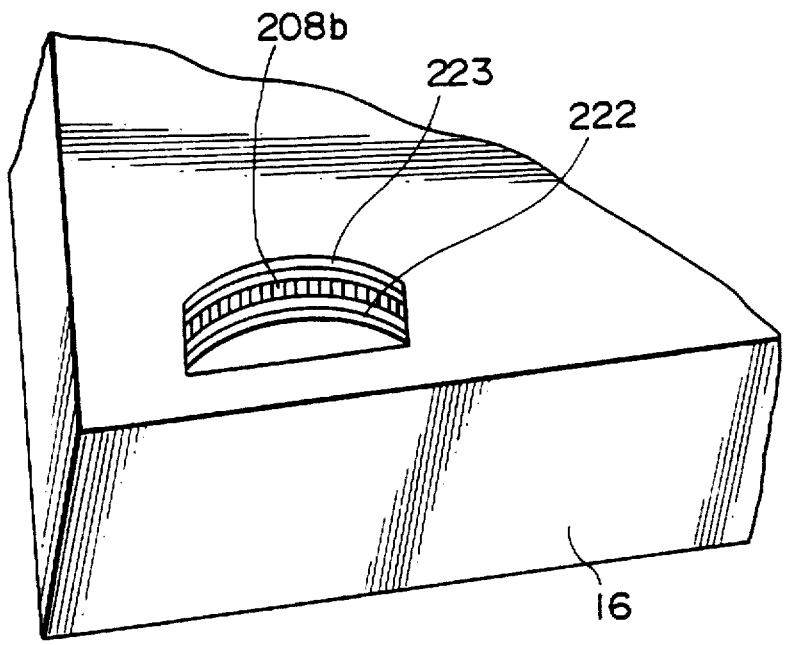
Figure 24:
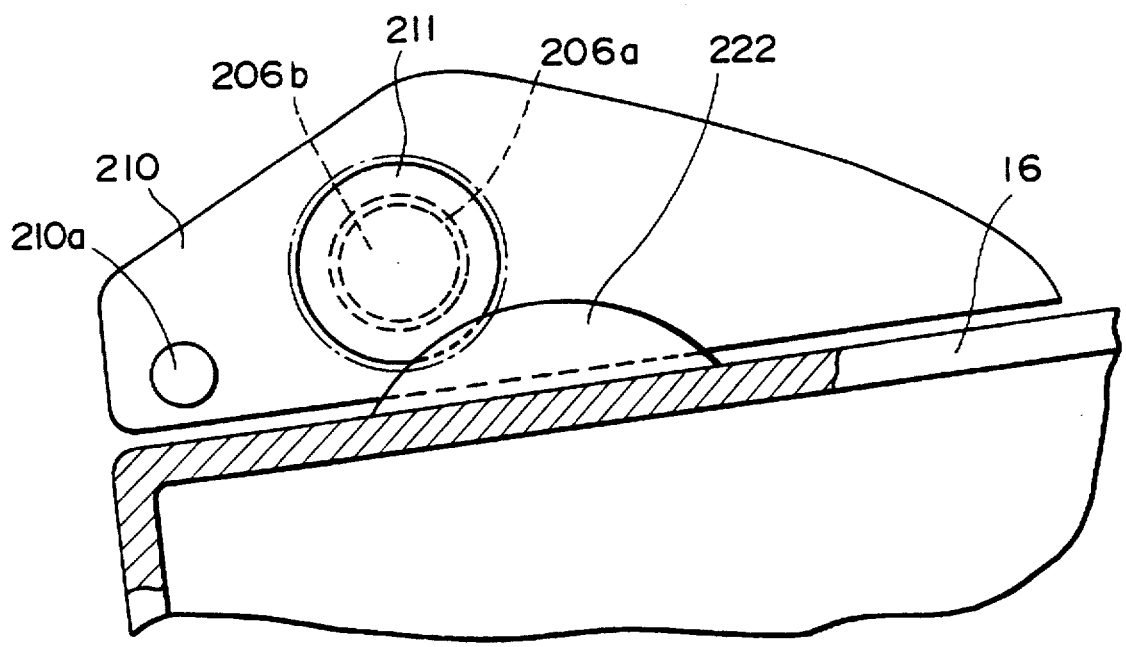

As shown in FIG. 23, a pair of flat positioning portions 222 and 223 protrude from the top cover 16 and respectively face the opposite ends of the idle gear 208b. As shown in FIG. 24, when the conveyor roller 206 is held in pressing contact with the read sensor 209, the positioning portions 222 and 223 extend toward the roller 206 beyond the teeth of the idle gear 208b in the radial direction of the gear 208b, thereby sufficiently enclosing the teeth of the gear 208b.

Figure 19A:
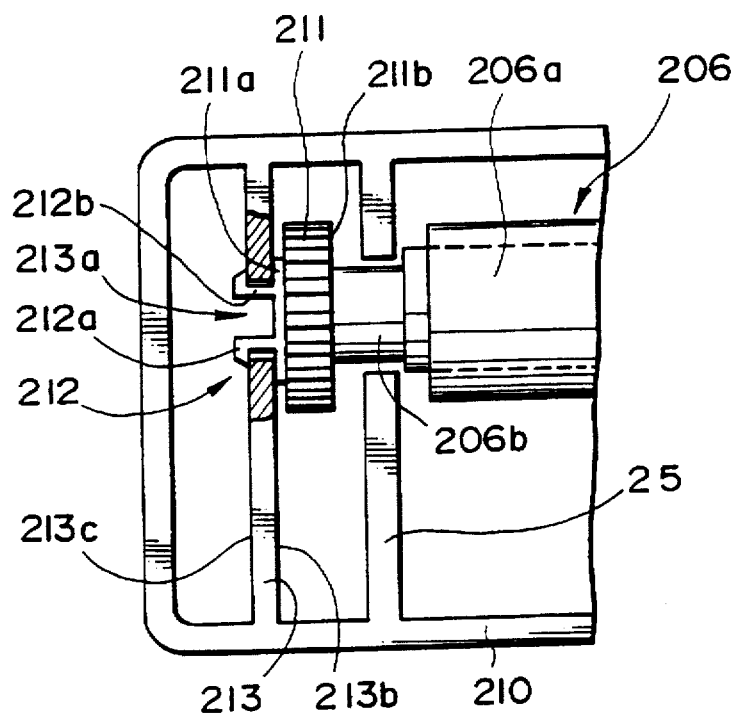
FIGS. 19A and 19B are fragmentary sections showing opposite end portions of the conveyor roller mounted on the scanner cover.
Figure 19B:
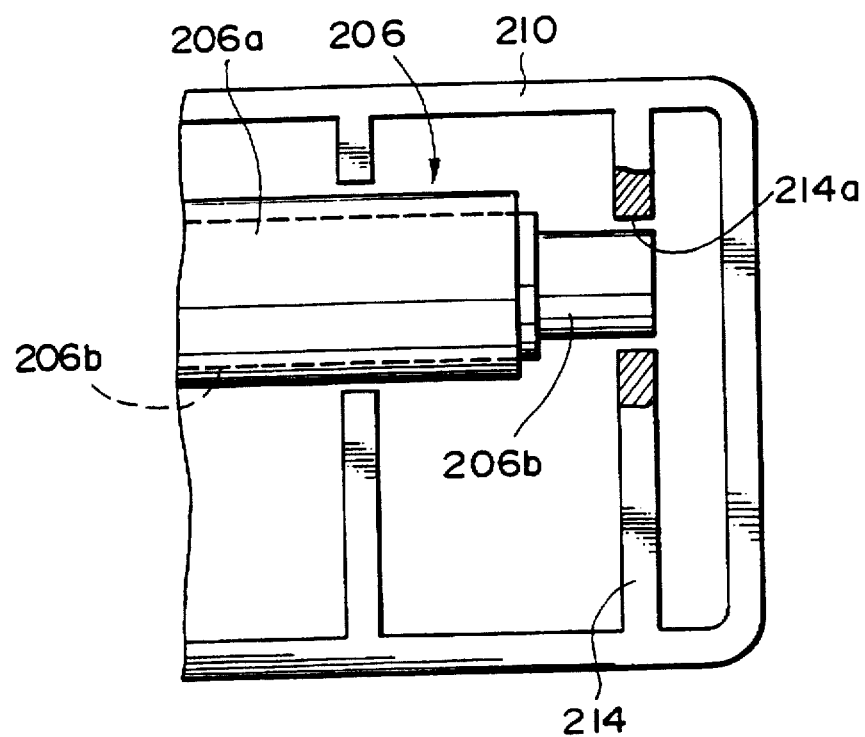

Also, the portions 222 and 223 respectively abut against the opposite ends 211a and 211b (211b is shown in FIG. 19A) of the gear 211. The portions 222 and 223 position the roller 206 relative to the base 14 in the axial direction of the roller 206 and, therefore, relative to the sensor 209. At the same time, the portions 222 and 223 reduce the load which acts on the end portions 212b of the lugs 212. This allows the rigidity of the lugs 212 to be reduced in the radial direction of the imaginary circle and, therefore, facilitates the mounting of the roller 206. Further, the portions 222 and 223, enclosing the teeth of the idle gear 208b, protect the teeth when the scanner cover 210 is opened to uncover the paper holder portion 302.

Figure 16:
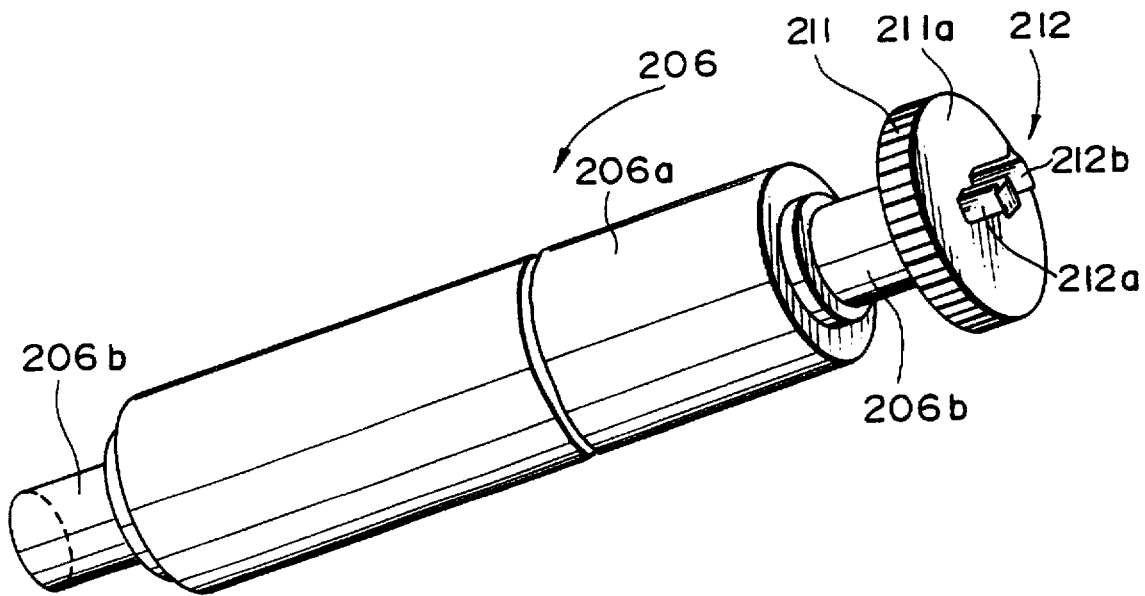
FIG. 16 is a perspective view of a conveyor roller included in a reading section of the embodiment.
Figure 17:
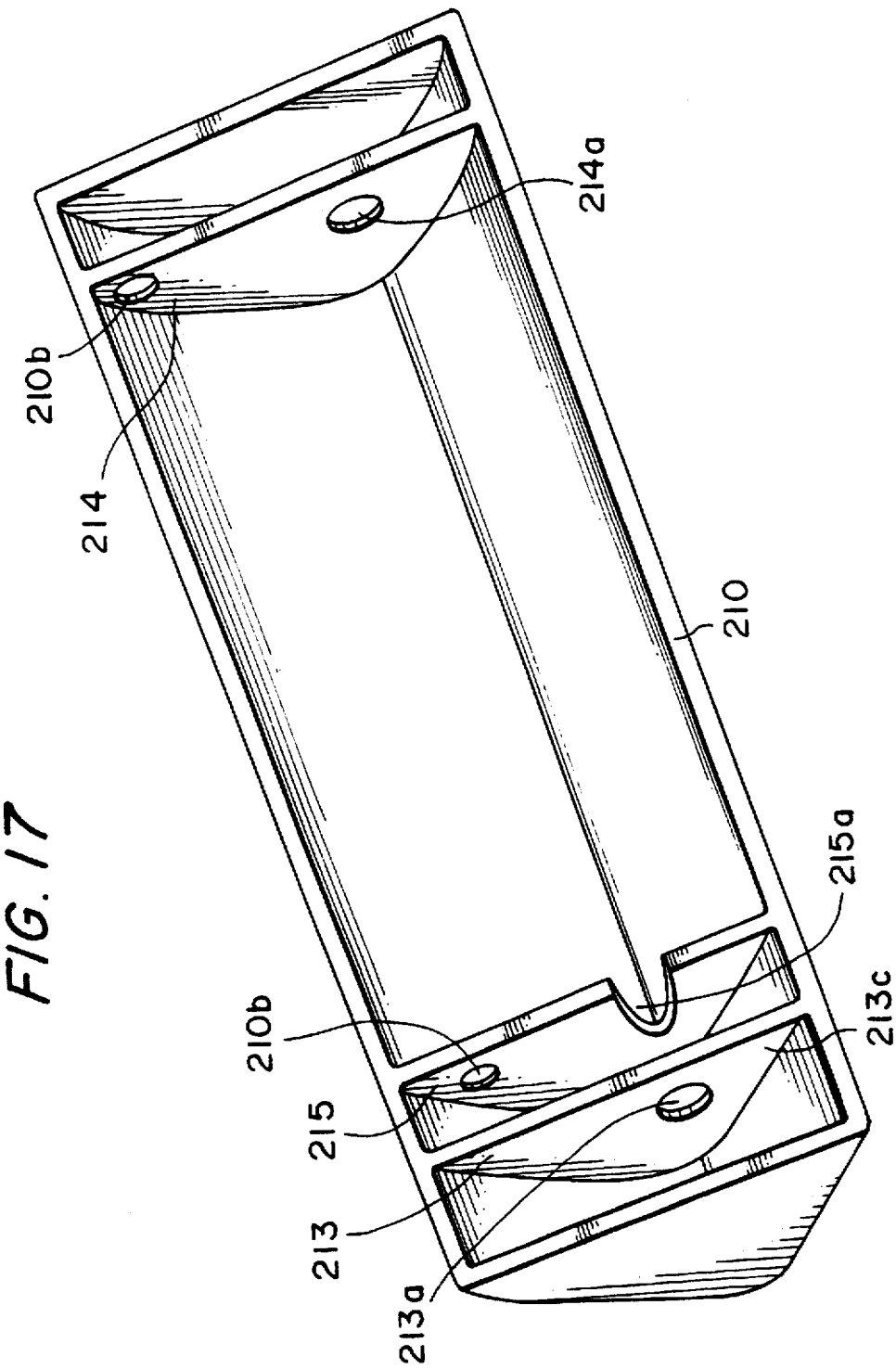
FIG. 17 is a perspective view of a scanner cover disposed in the reading section.
Figure 18:
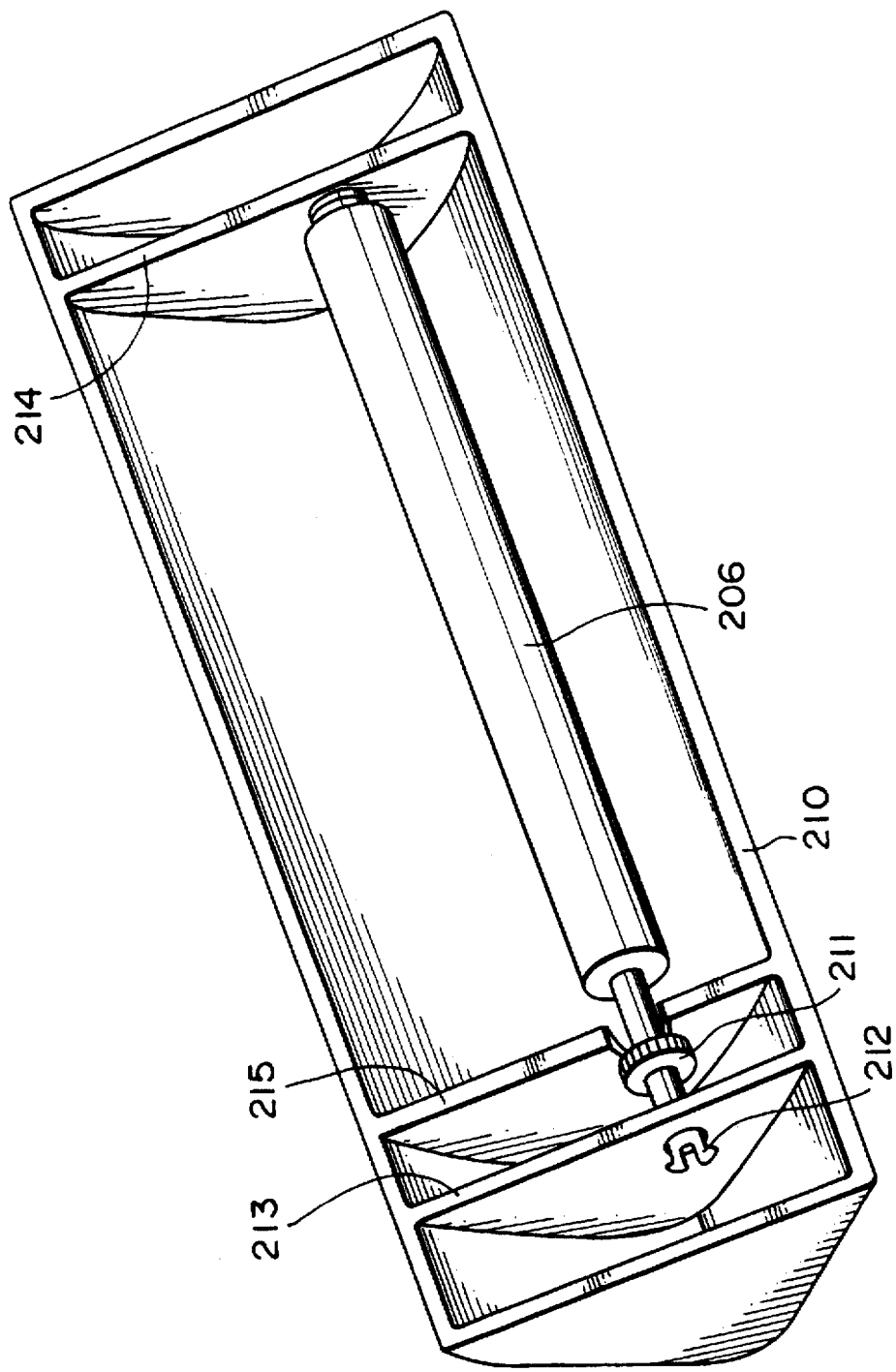
FIG. 18 is a perspective view of the conveyor roller mounted on the scanner cover.
Figure 25A:
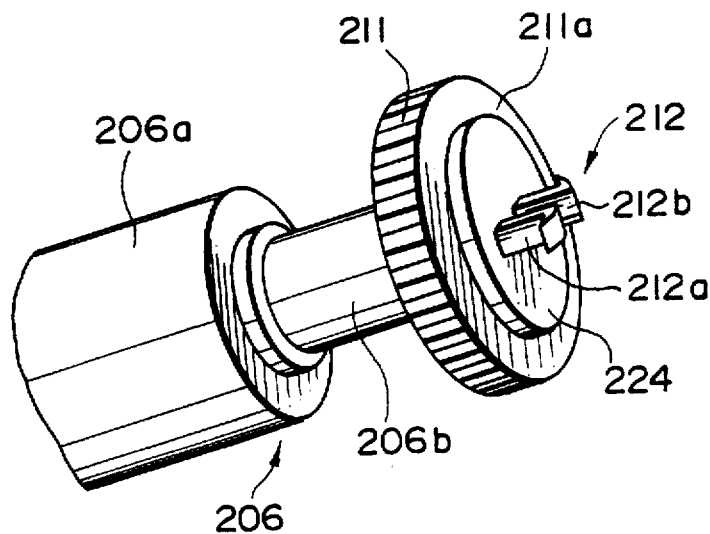
FIGS. 25A and 25B are perspective views showing a modified form of the conveyor roller.
Figure 25B:
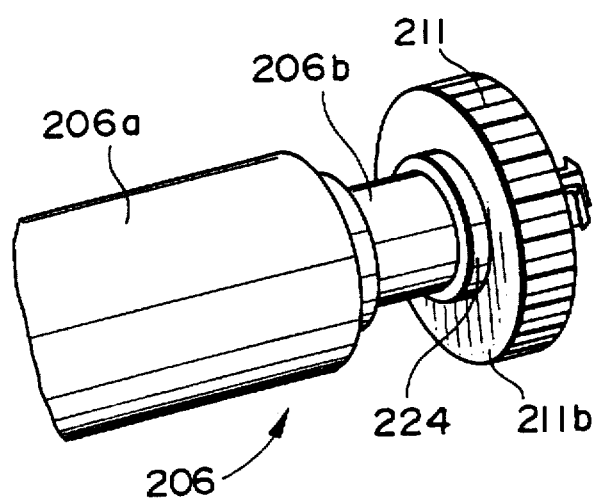

FIGS. 25A and 25B show a modified form of the conveyor roller 206 described with reference to FIG. 16. As shown, disk-like projections 224 and 225 are respectively formed on the opposite ends 211a and 211b of the gear 211, and each has a predetermined thickness. In this case, the positioning portions 222 and 223, not shown, are spaced apart from each other in such a manner as to accommodate the total thickness of the projections 224 and 225. Hence, the edges of the portions 224 and 225 are prevented from contacting the teeth of the gear 211. Since the projections 224 and 225 are disk-shaped, they are prevented from being caught by the edges of the positioning portions 222 and 223. Hence, the projections 224 and 225 do not obstruct the rotation of the conveyor roller 206 at all.

Figure 26:
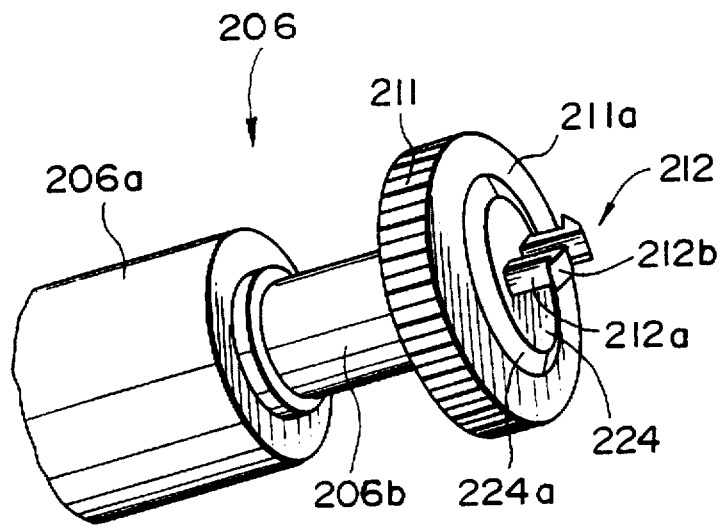
FIGS. 26 and 27 show another modified form of the conveyor roller.

FIG. 26 shows another modified form of the conveyor roller 206. As shown, the edges of the positioning portions 224 and 225 are chamfered, as at 224a and 225a (only 225a is visible). When the scanner cover 210 is rotated to cover the top 209 of the read sensor 209, the positioning portions 222 and 223 respectively abut against opposite ends of the projections 224 and 225, sliding on the chambered portions 224a and 225a. This allows the scanner cover 210 to be moved until the idle gears 208b and 211 fully mesh with each other, while preventing the projections 224 and 225 from abutting against the ends of the positioning portions 222 and 223.

Figure 27:
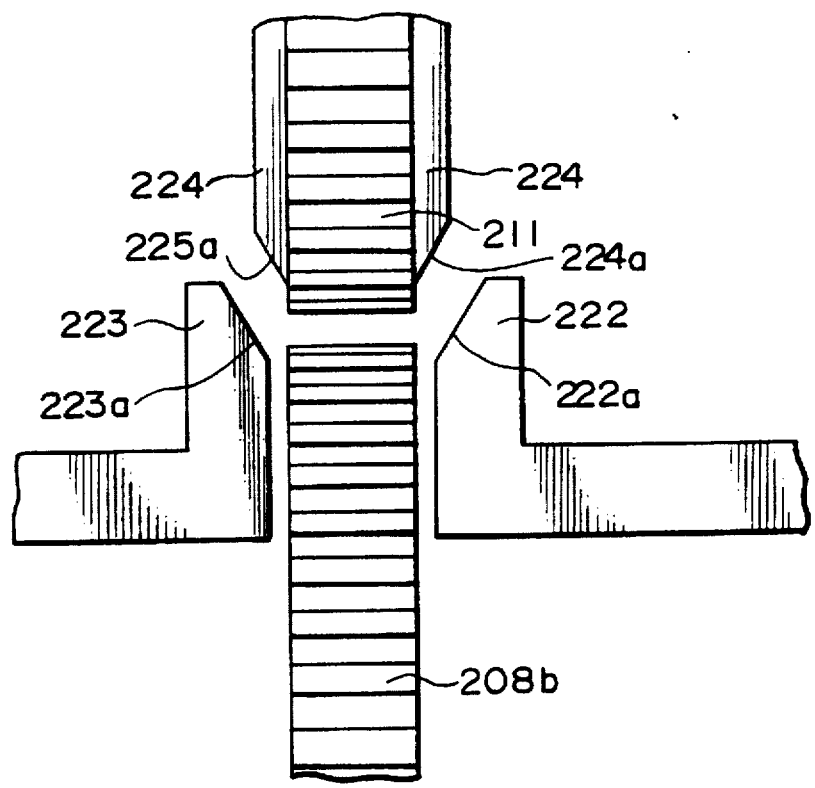

Further, as shown in FIG. 27, the positioning members 222 and 223 may be chamfered at their outer edges 222a and 223a, respectively. This prevents the gear 211 and positioning portions 222 and 223 from abutting against each other and allows the scanner cover 210 to rotate smoothly, thereby insuring the mesh of the idle gear 208b and gear 211.

The reading section 200 described above has various advantages, as enumerated below.

(1) The conveyor roller 206 has the lugs 212 and the end remote from the lugs 212 easily inserted into the holes 212a and 214a and restricted in axial movement by the gear 211, lugs 212, and rib 213. Hence, the roller 206 can be readily mounted to the scanner cover 210 without resorting to conventional members (e.g. E-rings) for restriction. This reduces the number of parts and assembling steps while enhancing quantity production.

(2) The lugs 212 are provided on one end 211a of the gear 211 and molded integrally with the gear 211 and the shaft portion 206b of the conveyor roller 206 by use of resin. This facilitates the assembly by eliminating errors ascribable to the dimensions of individual parts. In addition, the gear 211 does not need any part (e.g. screw) or extra work (e.g. milling) for assembly, so that restrictions on dimensional accuracy and management are eased.

(3) The shaft 206b portion is easily received in the support portion 215a, and the roller 206 is prevented from moving due to the deformation of the lugs 212 which are inserted in the hole 213a. Further, the shaft portion 206a portion is rotatably supported by the hole 214a and support portion 215a at opposite ends thereof, thereby reducing the deformation of the roller portion 206a. Hence, the roller portion 206 can be rotatably supported without resorting to bearings or similar extra parts.

(4) The curvature of the U-shaped support portion 215a and the diameter of the hole 214a are substantially the same as the diameter of the shaft portion 206a. The diameter of the hole 214a is greater than the diameter of the imaginary cylinder defined by the deformable portions 212a. Further, the support portion 215a is concentric with the holes 213a and 214a. The lugs 212, therefore, do not contact the rib 213. In this condition, the roller 206 is rotatably supported by the hole 214a and support portion 215a. Should the roller 206 be supported at three points thereof, undesirable loads would act in the radial direction of the roller 206 and deform the roller 206 in the axial direction. This eases restrictions on accuracy in the concentricity of the holes 213a and 214a and support portion 215a and, therefore, in dimensions and management, while allowing the rigidity of the lugs 212 to be reduced in the radial direction.

(5) The rib 213 has a thickness smaller than the axial dimension of the deformable portions 212a. The end 211a of the gear 211 abuts against the side 213b of the rib 213 when the conveyor roller 206 is moved to a particular position in the axial direction thereof. On the other hand, the lugs 212 are elastically restored when the roller 206 is moved to another particular position which is slightly different from the above-mentioned position. Under these conditions, the end 211a of the gear 211 and the end portions 212b of the lugs 212 are prevented from respectively abutting against the sides 213b and 213c of the rib 213 at the same time; otherwise, the rotation of the roller would be obstructed. This again eases restrictions on dimensional accuracy and management and, therefore, reduces cost.

(6) Since the shaft portion 206b and the gear 211 are molded integrally with each other, the roller 206 suffers from a minimum of play and backlash.

(7) The pressure urging the read sensor 209 against the conveyor roller 206 is substantially uniform over the entire axial dimension of the roller 206. A document is, therefore, surely conveyed without any skew and is read with accuracy by the read sensor 209.

(8) Since the pressing members 217a–217g form part of the sensor holding means 216, the number of constituent parts is reduced to simplify the arrangement around the read sensor 209. The pressing members 217a–217g formed integrally with the base 14 press the sensor 209 against the conveyor roller 206 due to the deformation thereof, further reducing the number of parts. Moreover, it is not necessary to mount independent pressing members, so that the arrangement around the sensor 209 is even more simplified and the assembly is facilitated.

(9) The width of the array of pressing members 217a–217g sequentially increases from the opposite ends toward the center. Therefore, the pressing members 217a–217g can be formed integrally with the base 14 despite that they each has a particular pressing characteristic.

(10) The pressing members 217a–217g each has the deformable portion adjoining the base 14 and having a smaller sectional area than the other portion. Hence, despite that the pressing members 217a–217g are simple in configuration, an adequate degree of deformation is readily achievable. It is, therefore, easy to cause the members 217a–217g to play the role of sensor holding means.

(11) The holes 221 of the positioning members 218a and 218b respectively mate with the lugs of the read sensor 209 to position the sensor 209 in two directions perpendicular to the pressure direction. This eliminates the need for an extra member for positioning the sensor 209. In addition, since the pressing members 217a–217g are implemented as plates whose thicknesswise direction is coincident with the pressure direction, they are scarcely deformable when subjected to forces in the other directions. These, in combination, allow the sensor 209 to move in the pressure direction without any deviation, despite the simple arrangement.

(12) The read sensor 209 can be positioned only if it is supported by the supporting members 219a–219d of the sensor holding means 216, engaged with the pawls 220 of the pressing members 217a–217g, and engaged with the holes 221 of the positioning members 218a and 218b. Hence, the sensor 209 can be roughly positioned with ease during assembly.

[3] Paper Feed Section 300

Referring to FIG. 1, the paper feed section 300 has the paper holder portion 302 formed integrally with the base 14. A paper roll 201 is received in the paper holder portion 302.

In summary, it will be seen that the present invention provides an image forming apparatus having head holding means formed integrally with a base thereof. This noticeably simplifies an arrangement around a record head, facilitates the mounting of the head, and eliminates the need for parts for holding the head. As a result, the number of parts is considerably reduced while the assembly is facilitated, so that the apparatus is small size and low cost. The apparatus insures quality images free from irregular image density since the head and a platen roller are pressed against each other by a unique configuration. The ease of assembly and miniature and low cost construction are further promoted since a conveyor roller is mounted in a unique configuration and since a read sensor and the conveyor roller are pressed against each other in a unique arrangement. The apparatus, therefore, allows a document to be surely fed without any skew.

Various modifications will become possible for those skilled in the art after receiving the teachings of the present disclosure without departing from the scope thereof.

What is claimed is:

1. An image forming apparatus comprising:

reading means for reading a document positioned at a reading section;

a conveyor roller facing said reading section and rotated via a gear provided at one end thereof; and a roller holding member for rotatably holding said conveyor roller;

said roller holding member being formed with a pair of aligned holes for removably mounting said conveyor roller when said conveyor roller is moved in an axial direction thereof;

said roller holding member and said conveyor roller comprising respective abutments abutting against each other when said conveyor roller is moved to one side in the axial direction;

one of said roller holding member and said conveyor roller comprising a deformable locking portion engaging, when said conveyor roller is moved to said one side, with the other of said roller holding member and said conveyor roller and deforming in a direction perpendicular to the axial direction of said conveyor roller, said deformable locking portion being, when said abutments abut against each other, elastically restored to thereby restrict a movement of said conveyor roller to the other side in the axial direction.

2. An apparatus as claimed in claim 1, wherein said deformable locking portion is provided on one end of said conveyor roller.

3. An apparatus as claimed in claim 1, wherein said conveyor roller has a shaft portion formed integrally with said gear by use of resin.

4. An apparatus as claimed in claim 1, wherein an axial position of said conveyor roller which causes said abutments to abut against each other and an axial position which causes said deformable locking portion to be restored are slightly different from each other.

5. An apparatus as claimed in claim 4, wherein said reading section is provided in a base of said apparatus;

said roller holding member comprising a scanner cover for selectively moving said conveyor roller toward or away from said reading section to thereby cover or uncover said reading section;

said base comprising positioning portions for positioning said conveyor roller in the axial direction in contact with opposite ends of said gear.

6. An apparatus as claimed in claim 5, wherein said positioning portions are formed flat and protrude toward said conveyor roller, as seen from said reading section, and face opposite ends of a gear which is mounted on said base and meshes with said gear of said conveyor roller.

7. An apparatus as claimed in claim 5, wherein said gear of said conveyor roller comprises a disk-like projection having a predetermined thickness at opposite ends thereof.

8. An apparatus as claimed in claim 5, wherein either portions of said positioning portions abutting against said gear of said conveyor roller or said gear is chamfered for guide.

9. An apparatus as claimed in claim 1, wherein said roller holding member comprises a support portion for abutting against said conveyor roller from a side opposite to said reading section and at a position different from positions where said aligned holes are formed.

10. An apparatus as claimed in claim 9, wherein said support portion is formed in a retainer rib included in said roller supporting member such that said retainer rib intervenes between a roller portion of said conveyor roller and said gear of said conveyor roller.

11. An apparatus as claimed in claim 9, wherein said support portion comprises a generally U-shaped notch.

12. An apparatus as claimed in claim 9, wherein when said deformable locking portion is restored, an end portion thereof contacts said roller holding member only in the an axial direction of said conveyor roller.

13. An apparatus as claimed in claim 1, wherein said gear has an outside diameter smaller than an outside diameter of a roller portion of said conveyor roller.

14. An image forming apparatus comprising:

reading means for reading a document positioned at a reading section;

a conveyor roller rotatable while facing said reading section; and pressing means for pressing said reading section such that said reading section and said conveyor roller are pressed against each other by a predetermined pressure with the intermediary of a document;

said pressing means comprising at least three elastically deformable pressing members respectively neighboring a center and opposite ends of said reading section in an axial direction of said conveyor roller for exerting pressures preselected such that when said reading section and said conveyor roller are straight, the pressure at said center is higher than the pressures at said opposite ends;

said conveyor roller being deformed by a predetermined amount by the pressures of said pressing members while being supported at opposite ends thereof and, in turn, causing said reading section to deform complementarily thereto, whereby said reading section and said conveyor roller are pressed against each other by a substantially uniform pressure.

* * * * *